(12) United States Patent
Lehman et al.

(10) Patent No.: US 11,799,200 B2
(45) Date of Patent: *Oct. 24, 2023

(54) RADIO ASSEMBLY WITH MODULARIZED RADIOS AND INTERCONNECTS

(71) Applicant: Telefonaktiebolaget LM Ericsson (publ), Stockholm (SE)

(72) Inventors: Brian Lehman, Ottawa (CA); Thomas Burn, Ottawa (CA); Scott Mason, Ottawa (CA); David Pell, Carp (CA); Jianjun An, Beijing (CN); Mårten Skoger, Huddinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 94 days.

This patent is subject to a terminal disclaimer.

(21) Appl. No.: 17/337,638

(22) Filed: Jun. 3, 2021

(65) Prior Publication Data

US 2021/0288400 A1    Sep. 16, 2021

Related U.S. Application Data

(63) Continuation of application No. 15/853,644, filed on Dec. 22, 2017, now Pat. No. 11,056,778.

(Continued)

(51) Int. Cl.
*H01Q 1/42* (2006.01)
*H04W 76/40* (2018.01)
(Continued)

(52) U.S. Cl.
CPC .............. *H01Q 1/42* (2013.01); *H01Q 1/246* (2013.01); *H01Q 1/247* (2013.01); *H01Q 5/30* (2015.01);
(Continued)

(58) Field of Classification Search
CPC .......... H01Q 1/42; H01Q 1/246; H01Q 1/247; H01Q 5/30; H04W 76/40
See application file for complete search history.

(56) References Cited

U.S. PATENT DOCUMENTS 5,323,295 A    6/1994   Pines
5,787,576 A    8/1998   Warren et al.
(Continued)

FOREIGN PATENT DOCUMENTS

CN    102273007 A    12/2011
CN    102395226 A    3/2012
(Continued)

OTHER PUBLICATIONS

Non-Final Office Action issued in U.S. Appl. No. 16/918,319 dated Mar. 31, 2022, consisting of 30 pages.
(Continued)

*Primary Examiner* — Dieu Hien T Duong
(74) *Attorney, Agent, or Firm* — Christopher & Weisberg, P.A.

(57) ABSTRACT

A radio assembly is provided. The radio assembly includes at least one radio module and a radome. The radio module has a heatsink disposed on one side and a radio module base on the other side thereof. The radio module base is disposed between the heatsink and the radome. The heatsink defines a cable channel for routing at least one power cable and at least one data cable.

13 Claims, 23 Drawing Sheets

Related U.S. Application Data

(60) Provisional application No. 62/490,462, filed on Apr. 26, 2017.

(51) Int. Cl.

| | |
|---|---|
| *H01Q 1/24* | (2006.01) |
| *H01Q 5/30* | (2015.01) |
| *H01Q 21/00* | (2006.01) |
| *H01Q 21/26* | (2006.01) |
| *H01Q 25/00* | (2006.01) |
| *H01Q 1/02* | (2006.01) |
| *H01Q 9/16* | (2006.01) |

(52) U.S. Cl.
CPC ......... *H01Q 21/0025* (2013.01); *H01Q 21/26* (2013.01); *H01Q 25/001* (2013.01); *H04W 76/40* (2018.02); *H01Q 1/02* (2013.01); *H01Q 9/16* (2013.01)

(56) References Cited

U.S. PATENT DOCUMENTS

| | | | |
|---|---|---|---|
| 5,828,339 | A | 10/1998 | Patel |
| 6,126,128 | A | 10/2000 | Costa et al. |
| 11,056,778 | B2* | 7/2021 | Lehman ............ H01Q 5/30 |
| 2003/0052830 | A1 | 3/2003 | Ogawa et al. |
| 2005/0195565 | A1 | 9/2005 | Bright |
| 2008/0204350 | A1 | 8/2008 | Tam et al. |
| 2010/0157231 | A1 | 6/2010 | Jung et al. |
| 2010/0157531 | A1 | 6/2010 | Mason et al. |
| 2010/0188310 | A1 | 7/2010 | Saddington et al. |
| 2010/0207705 | A1 | 8/2010 | Wang et al. |
| 2011/0032158 | A1 | 2/2011 | Rodger et al. |
| 2013/0222201 | A1 | 8/2013 | Ma et al. |
| 2013/0223012 | A1 | 8/2013 | Pierides et al. |
| 2016/0261030 | A1 | 9/2016 | Kim et al. |
| 2017/0187105 | A1 | 6/2017 | Emerick et al. |
| 2019/0312339 | A1 | 10/2019 | Fritze et al. |
| 2020/0335861 | A1* | 10/2020 | Lehman ............ H01Q 5/30 |

FOREIGN PATENT DOCUMENTS

| | | |
|---|---|---|
| CN | 103548274 A | 1/2014 |
| CN | 104205489 A | 12/2014 |
| CN | 104696827 A | 6/2015 |
| CN | 106169651 A | 11/2016 |
| EP | 1291960 A2 | 12/2013 |
| GB | 2310571 A | 8/1997 |
| GB | 2337861 A | 12/1999 |
| JP | 2003-152419 A | 5/2003 |
| JP | 2015-512218 A | 4/2015 |
| WO | 2013/123909 A1 | 8/2013 |
| WO | 2013/123913 A1 | 9/2013 |

OTHER PUBLICATIONS

European Communication Pursuant to Article 94(3) EPC dated Dec. 13, 2022 issued in corresponding European Patent Application No. 18 724 618.6, consisting of 7 pages.

Final Office Action dated Jun. 13, 2022 issued in U.S. Appl. No. 16/918,319 , consisting of 12 pages.

Japanese Office Action and English language Summary of the Japanese Office Action dated Sep. 9, 2022 issued in corresponding Japanese Patent Application No. 2021-119788, consisting of 8 pages.

Malaysian Office Action dated Nov. 17, 2022 issued in corresponding Malaysian Patent Application No. PI2019005970, consisting of 3 pages.

Non-Final Office Action dated Nov. 7, 2022 issued in U.S. Appl. No. 16/918,319, consisting of 17 pages.

Non-Final Office Action dated Oct. 18, 2022 issued in U.S. Appl. No. 16/918,304, consisting of 9 pages.

Communication Pursuant to Article 94(3) EPCT dated Jul. 15, 2021 issued in corresponding European Patent Application No. 18 724 618.6, consisting of 6 pages.

Non-Final Office Action issued in U.S. Appl. No. 16/918,304, consisting of 33 pages.

Japanese Office Action and English Summary of the Japanese Office Action dated Dec. 11, 2020 issued in corresponding Japanese Patent Application No. 2019-554418, consisting of 5 pages.

Indian Examination Report dated Nov. 25, 2020 issued in corresponding Indian Application No. 201917038105, consisting of 6 pages.

Chinese Office Action and English language Summary of the Office Action together with an English translation of the Search Report dated Nov. 26, 2020 issued in corresponding Indian Application No. 201880026746.6, consisting of 12 pages.

International Search Report and Written Opinion dated Sep. 12, 2018 issued in PCT Application No. PCT/IB2018/052920, consisting of 17 pages.

\* cited by examiner

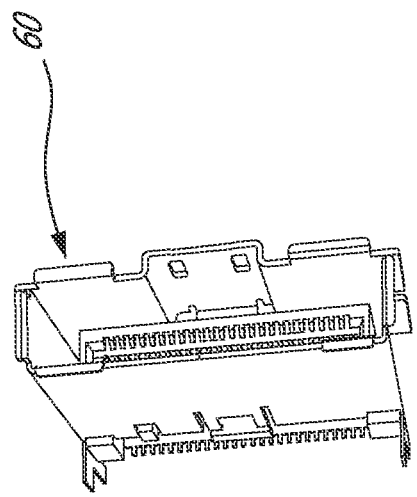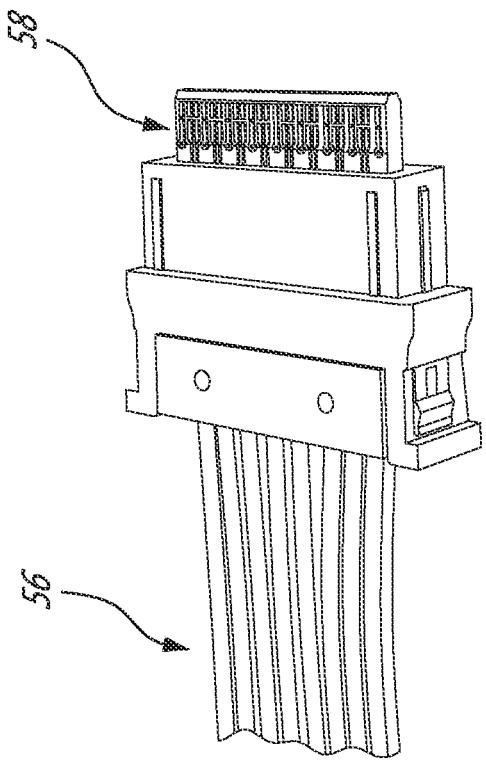
FIG. 18

RADIO ASSEMBLY WITH MODULARIZED RADIOS AND INTERCONNECTS

CROSS-REFERENCE TO RELATED APPLICATION

This application is a continuation of and claims priority to U.S. application Ser. No. 15/853,644, filed Dec. 22, 2017, entitled "RADIO ASSEMBLY WITH MODULARIZED RADIOS AND INTERCONNECTS" and which claims priority to U.S. Provisional Application No. 62/490,462, filed Apr. 26, 2017, entitled "RADIO ASSEMBLY WITH MODULARIZED RADIOS AND INTERCONNECTS", the entireties of both of which are incorporated herein by reference.

TECHNICAL FIELD

Wireless communications, and in particular to a radio assembly with modularized radios and interconnects.

BACKGROUND

The next generation mobile wireless communication system (5G) or new radio (NR) will be deployed in tower-top, rooftop and streetscape locations. These 5G wireless products distinguish themselves by offering increased capacity and coverage, leveraging increased antenna branch counts, modulation, MIMO and UE schemes. The market view of the optimal antenna branch count is evolving rapidly, and the data transported to and within the radio is increasing in lockstep.

Problems with Existing Solutions

Existing radio assembly practices do not offer an appropriate modular building practice for antenna branch count flexibility for new 5G wireless products, and typically rely on weather-hardened cables for distributing power and high speed data among serial interfaces. For example, existing low-antenna-branch count (less than eight antenna branches) radio assembly solutions with analog interfaces can route radio frequency cables externally between analog subsystems. For higher antenna branch counts in the analog case, multiple radio frequency (RF) cables become unmanageable and substantially increase cost. In the digital case, keeping serial cables inside the housing would require multiple mechanical housings, which can quickly become unmanageable for sixteen and thirty-two antenna branch examples. Neither of these options scale well in a modular way as the technology evolves from two antenna branch devices to a thirty-two antenna branch devices.

Also, existing radio assemblies suffer from passive intermodulation (PIM), electromagnetic interference (EMI) and/or other sources of interference. In particular, PIM is a growing issue for wireless network operators. PIM can create interference that will reduce a radio's sensitivity, thereby reducing a network reliability, throughput, etc. For example, receivers will become less sensitive to weaker signals due to PIM. Even slight increase in PIM have been shown to contribute to decreases in downlink speeds for various reasons such by requiring more error correction bits thereby limiting resources used for data.

PIM occurs when signals are present in a passive device or component that exhibits some non-linear behavior. In wireless communication devices such as a base station of a wireless communication network, PIM occurs when a high power transmit signal is passed through a passive device or component that exhibits some non-linearity. Such non-linear components include connectors, the radio assembly, and the like, among other non-linear components. While some existing solutions require pre- and/or post-processing of wireless devices signals to try to remove PIM, these solutions do not tackle the source of PIM. Further, implementing pre- and/or post-processing of wireless devices signals to compensate for PIM, waste processing resources that could otherwise be used to improve data throughput and/or reliability.

Previously, alternate cabling strategies required unique extrusions/castings, where the middle radio required an entry hole from an optical fiber interface and exited to the far radio, and the far radio only required an entry port, which increased manufacturing cost and necessitated unique radio assembly depending on the location of the radio within the overall structure.

In previous designs, cables and conduits were placed closer to the antennas and the antennas back lobe where the cable port was under or through the radio modules. These designs were more susceptible to PIM.

SUMMARY

Some embodiments advantageously provide a radio assembly with at least one radio module and radome, thereby providing modularized radios and interconnects.

According to one aspect of the disclosure, a radio assembly is provided. The radio assembly includes at least one radio module and a radome. The radio module has a heatsink disposed on one side, a radio module base on the other side thereof. The radio module base is disposed between the heatsink and the radome. The heatsink defines a cable channel for routing at least one power cable and at least one data cable.

According to one embodiment of this aspect, a reflector disposed between the radome and the radio module base. The base includes a plurality of standoffs. The plurality of standoffs are configured to offset a substantial portion of the at least one radio module from the reflector. According to one embodiment of this aspect, the heatsink includes a plurality of fins. According to one embodiment of this aspect, the plurality of fins are oriented 45 degrees with respect to the plurality of standoffs. According to one embodiment of this aspect, the plurality of fins of a heat sink of a first radio module is oriented 45 degrees in one direction and the plurality of fins of a heat sink of a second radio is oriented 45 degrees in the opposite direction of the first radio module.

According to one embodiment of this aspect, the radio assembly further includes a cable bridge configured to be removably inserted into the cable channel. The cable bridge includes a plurality of cable apertures and a plurality of gaskets. Each of the plurality of gaskets are configured to seal a perimeter of a respective cable aperture of the plurality of cable apertures. According to one embodiment of this aspect, the cable apertures are sealed when the cable bridge is inserted into the cable channel. According to one embodiment of this aspect, the cable bridge is provided with cable apertures on two sides thereof, a first side facing the cable channel and a second side facing the opposite direction. According to one embodiment of this aspect, the apertures of the second side consists of a single open cavity extending the length of the cable bridge. According to one embodiment of this aspect, the cable bridge is provided with a cap to seal the cable apertures of the second side. According to one embodiment of this aspect, the cap is provided with heat sink fins.

According to one embodiment of this aspect, the radio assembly further includes a faceplate interface board (FIB). The FIB includes a plurality of opto-electronic connectors and a power unit. The radio assembly further includes at least one power cable in communication with the power unit and at least one data cable in communication with the at least one opto-electronic connector. The at least one power cable is routed to the radios via the cable bridge and at least one cable aperture. The at least one data cable is routed to the radios via the cable bridge and the at least one cable aperture. According to one embodiment of this aspect, the faceplate interface board (FIB) is provided with removable tabs for receiving additional opto-electronic connectors.

According to one embodiment of this aspect, the at least one power cable and the at least one data cable are non-hardened cables. According to one embodiment of this aspect, the at least one radio module has 16 transmit and 16 receive radios. According to one embodiment of this aspect, the radio assembly is expandable to 32 transmit and 32 receive radios using the FIB. According to one embodiment of this aspect, the radio assembly further includes a reflector. The at least one radio module base is disposed on the reflector. The radio assembly further includes a radome includes a plurality of antennas. The reflector is disposed on the radome. The radio assembly further includes at least one pin, the at least one pin configured to fasten the at least one radio module base to the reflector.

According to one embodiment of this aspect, the at least one pin is configured to be aligned with a back lobe of a row of the plurality of antennas. According to one embodiment of this aspect, the at least one pin is configured to be misaligned with a back lobe of a row of the plurality of antennas. According to one embodiment of this aspect, the at least one pin includes a plurality of pins. At least one pin of the plurality of pins is configured to be aligned with a back lobe of a row of the plurality of antennas. At least one other pin of the plurality of pins is configured to be misaligned with a back lobe of a row of the plurality of antennas. According to one embodiment of this aspect, the plurality of antennas are dipole antennas. According to one embodiment of this aspect, a mount is provided for securing the radio assembly to a surface. According to one embodiment of this aspect, a portion of the mount is positioned on and/or against the reflector on one side and the heat sink on the opposite side. According to one embodiment of this aspect, a portion of the heat sink and the mount is removed or carved in to form a cavity to provide a handle. According to one embodiment of this aspect, the mount further comprises a lifting tab for hoisting the radio assembly onto a surface.

According to another aspect of the disclosure. A radio assembly includes at least one radio module and a radome. The radio module has a heatsink disposed on one side, a radio module base on the other side thereof. The radio module base is disposed between the heat sink and the radome. The heatsink defines a cable channel for routing at least one power cable and at least one data cable. The radio assembly includes a cable bridge configured to be removably inserted into the cable channel, the cable bridge including: a plurality of apertures and a plurality of gaskets. Each of the plurality of gaskets configured to seal a perimeter of a respective cable aperture of the plurality of cable apertures. The radio assembly includes a cap configured to be removably fitted onto the cable bridge. The radio assembly includes a reflector. The radio module base is disposed on the reflector. The radio module base includes a plurality of standoffs. The plurality of standoffs configured to offset a substantial portion of the radio module from the reflector. The radome includes a plurality of antennas. The reflector is disposed on the radome. The radio assembly includes at least one pin. The at least one pin configured to fasten the radio module base to the reflector. The radio assembly includes a faceplate interface board (FIB). The FIB includes: a plurality of opto-electronic connectors, and a power unit. The radio assembly includes at least one power cable in communication with the power unit. The at least one power cable is routed to the at least one radio via the cable bridge and at least one cable aperture. The radio assembly includes at least one data cable in communication with the at least one opto-electronic connector. The at least one data cable is routed to the radio via the cable bridge and the at least one cable aperture. The at least one power cable and the at least one data cable are non-hardened cables. The at least one pin is at least one of aligned and misaligned with a back lobe of a row of the plurality of antennas.

Advantages of the Proposed Solution

Certain embodiments may provide potential benefits compared to conventional techniques and technologies.

Some of the advantages of the radio assembly with the cable channel and modularization described herein include:
- Allows use of inexpensive non-hardened cables by providing EMI protection for non-hardened cables.
- In one embodiment a heat sink is used as the cap on the cable bridge to increase thermal conductivity. The cap is described below.
- Ready access for manufacturing test and logical assembly to all connection points.
- Ready access for replacement of modules while in the field or during real life situations.
    - Modularity of radio assembly allows for innovative frequency band mixes into the market. For example, one radio module operating in one radio frequency band and one radio module operating in a second radio frequency band.
- Cable bridge in a cable channel provides mechanical stiffening for the radio assembly; including vibration dampening.
- All gasketed surfaces are 2-dimensional, 2-surface mating.
    - Limited gasketed surfaces where water can stand when the radio assembly is mounted.
    - In one or more embodiments, shaped (e.g., cone, pyramid and/or house or inverted V-shaped) gaskets shed water to prevent standing water on radio assembly and prevent water from collecting at the top junction of the cable bridge since the cable bridge will be vertical when the radio is installed.
- Rear access through the cable bridge and through cable apertures allows all radio heat sink extrusions to be the same, thereby reducing manufacturing cost.
- In one or more embodiments, two lengths of cable bridge can be provided, one for 16 Transmit and 16 Receive (16T16R) radios and one for 32T32R radios; focusing customization on the smallest mechanical/modular piece such as the radio module.
- Heat sink, e.g., fins, provisioned for vertical radio mounting.
    - Horizontal mounting is also supported readily with this modularity, by placing radios side-side, and with separate extrusions with thermal fins running in the opposite direction. For example, if the radio assembly is mounted horizontally, the radio modules will have fins oriented perpendicular so that the fins always point vertically (at least in this embodiment). In one or more embodiments, the cable bridge will be machined through fins and will then be perpendicular to fin orientation as opposed to axially. In one or more embodiments, the radio module and heat sink are square shaped with a cross-shaped cable bridge, thereby making rotation of the module and heat sink for fin orientation easier.

Alternately, in one or more embodiments, the heat sink includes 45 degree angled fins with the cable bridge that supports separate horizontal and vertical mounting without have to re-orient the fins with respect to the radio assembly.

Modular building practice allowed by the radio assembly is amenable to best-practice PIM-reduction techniques:
   Limited metal to metal contact between the base of the radio module, i.e., radio module base, and the reflector in the back lobe of the antenna to reduce the generation of PIM as this back lobe energy excites PIM.
   Rectangular radio modules use a 4-contact point mounting strategy to the antenna reflector—suitable for Johnson-rings isolation.
   The placement location of the radio mounting feet (standoffs) minimize PIM susceptibility. In one or more embodiments, feet (standoffs) could be:
      In-line, i.e., aligned, with an antenna dipole;
      In-between, i.e., misaligned, adjacent antenna dipoles; or
      At dithered relative locations, i.e., aligned and misaligned.
   Location of cable bridge is placed far from the radiating elements.
   Reduced PIM due to configured mechanical structure and component layout without having to implement electrical compensation, e.g., pre-processing or post-pressing, to reduce PIM.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 18 is a top view of a cable with a male connector, and female connector in accordance with the principles of the disclosure;

DETAILED DESCRIPTION

Figure 1:
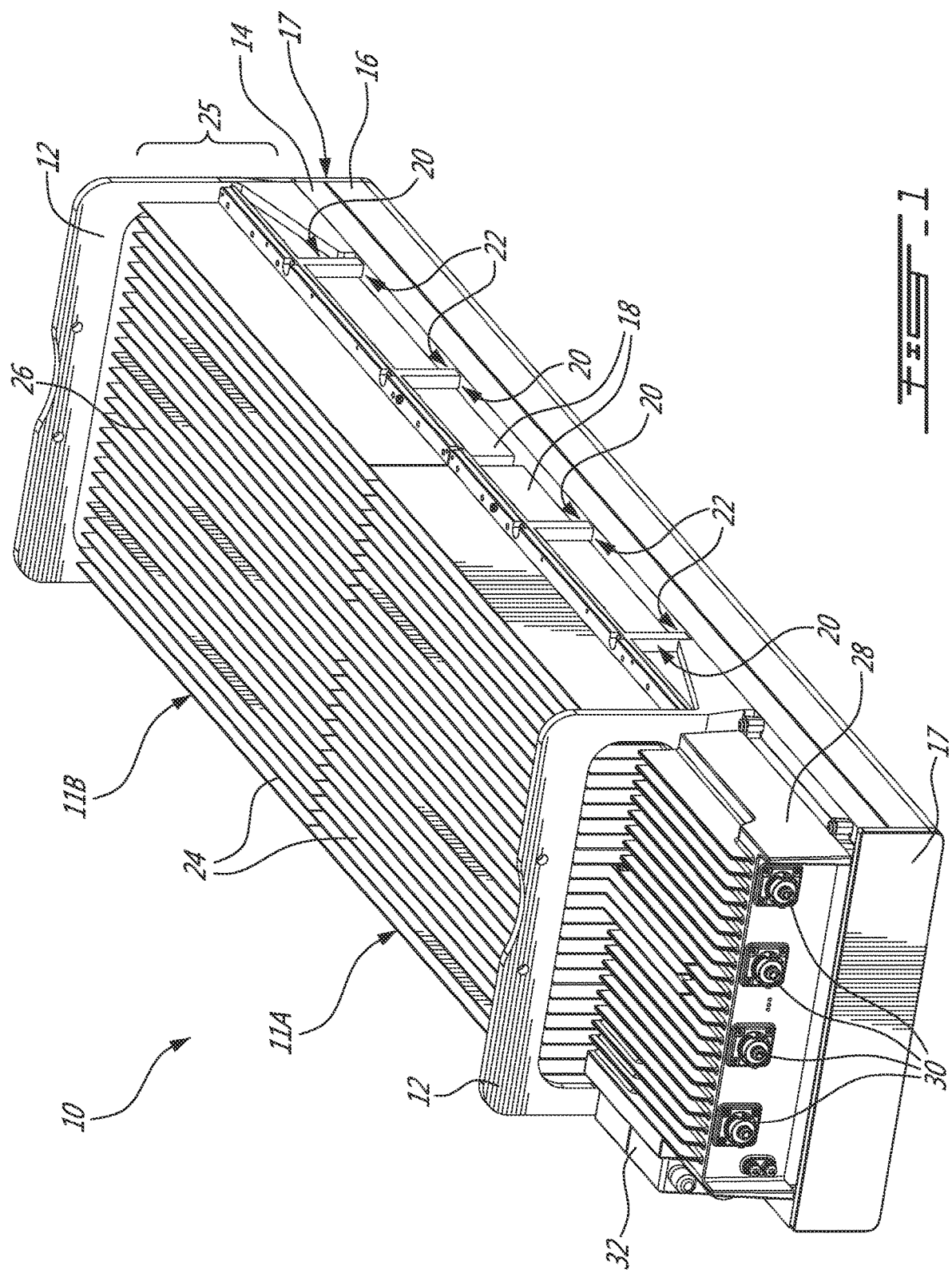
FIG. 1 is a diagram of an exemplary radio assembly with modularized radios and interconnects in accordance with the principles of the disclosure.

As indicated previously, the instant disclosure advantageously describes a radio assembly with modularized radios and interconnects. The modularization advantageously allows for the radio assembly to be scaled up with ease. For example, in one or more embodiments, a radio module with sixteen transmitters and sixteen receivers (16T16R radio module) is placed in communication with a faceplate interface board (FIB) that is provisioned for 32 antenna branches. In other words, the FIB design for 16T16R would stay the same but openings for other connectors would be covered by removable plastic tabs. The plastic tabs would be pushed or broken to make way for additional opto-electronic connectors for the additional radio module. Updating the radio assembly to include another 16T16R radio module to increase the transmitters/receivers to thirty-two entails using the same FIB while adding another radio module and cables. Hence, the embodiments described herein allow for easy scaling.

Further, the radio assembly includes an environmentally hardened cable bridge where both power and high-speed serial cables are routed from the FIB and across the heat sink side of the radio module(s) within a cable bridge length for 16T16R or 32T32R. This allows for the use of inexpensive non-hardened cables (as compared with hardened cables). In one or more embodiments, radio frequency (RF) connections between the radio modules and the antenna are provided through blind-mate press-fit connections, with an electromagnetic interference (EMI) resistant and weather-seal gasket compressed between the radio and antenna.

Before describing in detail exemplary embodiments, it is noted that the embodiments reside primarily in combinations of apparatus components related to a radio assembly. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to the drawing figures in which like reference designators refer to like elements there is shown in FIG. 1 is a diagram of an exemplary radio assembly 10 with modularized radios and interconnects in accordance with the principles of the disclosure. As presented in FIG. 1, the illustration of the radio assembly shows predominantly the rear of the radio with heat dissipation fins, that is, the side used for pole attachment whereas the front side of the radio, with the antenna radome points towards the end users.

Radio assembly 10 includes at least one radio module 11 such as radio modules 11a-b. As used herein, radio module 11 refers to one or more of radio modules 11a-b. While two radio modules 11 are illustrated, more or less than two radio modules 11 are equally applicable to one or more embodiments of radio assembly 10 in accordance with the principles of the disclosure. Radio assembly 10 includes mount 12 that supports various portions of radio assembly 10 as described herein and is used to secure the radio assembly to walls, masts and other surfaces used for mounting the radio. Mount 12 may be constructed of aluminum or other suitable metal. At least a portion of mount 12 is positioned on and/or against reflector 14. Reflector 14 is configured to redirect electromagnetic energy. In one or more embodiments, reflector 14 is mounted on and/or positioned adjacent antenna radome 16 (referred to as radome 16). Radome 16 is configured to house one or more antennas as described in detail below. Radio assembly 10 includes one or more end plates 17. Each radio module has a radio module base 18 (referred to as base 18). It should be noted that although labelled as a base in the present disclosure in view of the orientation of the assembly in FIG. 1, the base 18 also functions as a cover, as it serves to weatherproof the radio module electronics from the outside elements. Whether labelled as a base or a cover, this part of the radio assembly acts to enclose to the radio module electronics on one side with the radio module heat sink on the other. In one or more embodiments, radome 16 is made from material transparent to radio waves or that provides minimal attenuation of electromagnetic waves. In one or more embodiments, base 18 includes one or more filters, one or more radios and one or more shields as described herein.

Base 18 includes one or more standoffs 20 that are configured to provide spacing, a gap or an offset 25 between base 18 and reflector 14, thereby reducing physical contact between base 18 and reflector 14 since the standoffs help separate the base and reflector a certain distance apart. Gap 25 is visible with reference to FIG. 10. In one or more embodiments, standoffs 20 are beneficial to the mitigation of PIM. PIM is induced through undefined metal to metal contact. Standoffs 20 accomplish at least two things: (1) standoffs 20 raise the base of radio module so that it does not contact reflector 14, and (2) standoffs 20 provide a defined surface, improved further by a Johnson ring (in one or more embodiments), so that the contact force and contact surface (i.e., contact points 22) between the base of the radio module and reflector 14 is precisely controlled. Johnson rings are known to provide low electrical resistance while able to receive high contact forces when base 18 is tightly secured against reflector 14. In one or more embodiments, direct contact between base 18 and reflector 14 is limited to contact points 22. In one embodiment, when the radio assembly has two radio modules, radio assembly 10 is configured to have eight contact points 22 when two radio bases 18 are implemented, and four contact points when one base 18 or one radio module 11 is implemented. The reduced contact between base 18 and reflector 14 advantageously help minimize passive intermodulation (PIM) susceptibility of radio assembly 10.

Figure 2:
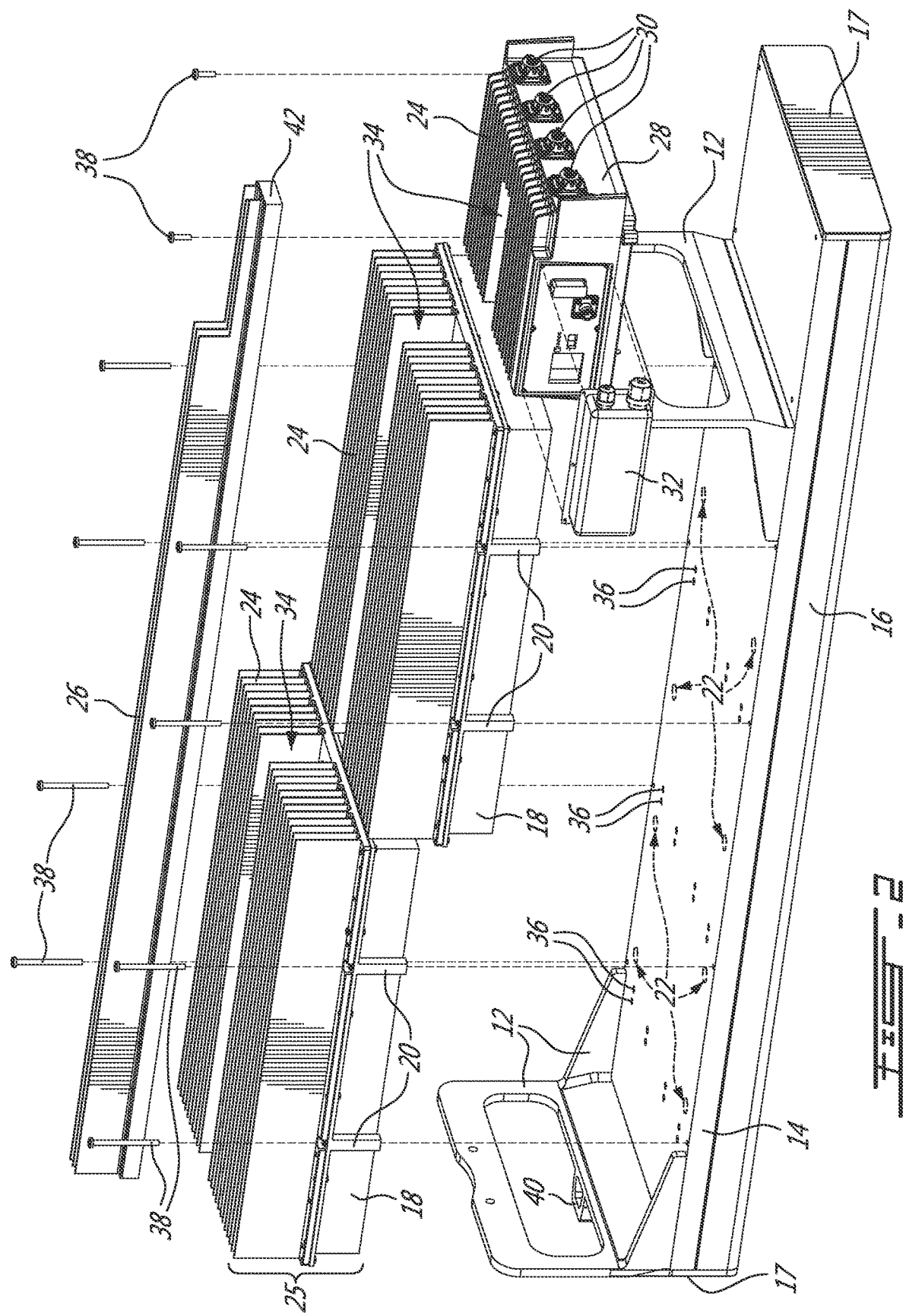
FIG. 2 is an exploded view of the radio assembly in accordance with the principles of the disclosure.

Radio assembly 10 includes one or more heat sinks 24 mounted against, on top of and/or adjacent to base 18. In one or more embodiments, heat sink 24 includes a plurality of fins that are substantially parallel to each other. In one or more embodiments, the plurality of fins are angled at forty-five degrees with respect to the perimeter such as to accommodate vertical and horizontal mounting of radio assembly 10 without having to rotate the fins to accommodate water drainage and/or airflow. Other fin shapes and/or orientations are possible in accordance with the principles of the disclosure. In one or more embodiments, heat sink 24 includes a plurality of heat sinks 24 that are individually positioned as part of radio assembly 10. In one or more embodiments, heat sink 24 defines a trough or cable channel for routing one or more cables via a cable bridge or guide between radio modules (described below). In other words, heat sink 24 is a structure designed/machined with a channel as described herein. In one or more embodiments, modular blocks of radio assembly 10 are referred to as radio module 11 in which radio module 11 includes heatsink 24 and base 18, among other components located between heat sink 24 and base 18 that are described herein. Radio assembly 10 includes a cap 26 that is configured to be removably inserted into the cable channel and above the cable bridge 42 (FIG. 2). The cap 26 shown in FIG. 1 has heat sink fins to advantageously increase thermal connectivity of radio assembly 10. In one or more embodiments, the fins are removed from the cap (see FIGS. 21 & 22). In one or more embodiments, a portion of heat sink 24 adjacent to mount 12 is removed or carved in to provide a cavity during fabrication such as to provide a handle location for an installer to grab mount 12, and hence grab radio assembly 10. In some embodiments, heat sink 24 and cap 26 are made of materials suitable to act as heat sinks as is known in the art.

Radio assembly 10 also includes faceplate interface board (FIB) 28. In one or more embodiments, FIB 28 is provisioned for thirty-two antenna branches, although FIB 28 can support more or less antenna branches. FIB 28 provides several functions, in one or more embodiments, such as conversion of optical signal(s) to electrical signal(s), and distributing power from a power source to components in radio assembly 10, thereby allowing all cables to be concentrated in one area to facilitate modularity and growth of radio modules 11. Radio module 11 in this example refers to a configuration of base/enclosure 18, heatsink 24, radios, shield and filters that are removably attached to radio assembly 10 such as to allow for modularization and scaling of radios in a user friendly manner. FIB 28 includes one or more opto-electrical connectors 30, power unit 32 that connects to a power source (not shown), and other elements such as cables and connectors. Therefore, FIB 28 advantageously provides a single interface that supports various numbers of radios as described herein.

FIG. 2 is an exploded view of radio assembly 10 in accordance with the principles of the disclosure. Cable channel 34 is defined by a plurality of heat sinks 24, that is, the cable channel 34 is created by the absence of heat sink fins on each radio module such that each heat sink 24 provides for at least a portion of cable channel 34 (e.g., a first heat sink 24 is designed/machined with a first cable channel 34 that aligns with a second cable channel 34 of a second heat sinks 24), and advantageously provides EMI protection for non-hardened cables, e.g., non-insulated cables. In the past, proximity of serial/data cables with antennas has been a main contributor of EMI, but radio assembly 10 advantageously allows for cables to be routed through cable bridge 42 in cable channel 34 that is located distally from antennas in radome 16, i.e., located on an opposite side or portion of radio assembly 10, such as to help prevent and/or reduce EMI due to proximity of cables to the antennas. In prior art systems, some EMI mitigation could be achieved with the use of hardened or insulated cables. These could help reduce EMI due to close proximity of cables to antennas, the hardened cables are thicker or bulkier and thus make it difficult to manipulate for installation and increase the cost of the radio assembly. Cable bridge 42 is advantageously configured to support and route non-hardened cables.

In one or more embodiments, a length of cable bridge 42 is automatically adjusted by the addition or removal of one or more radio modules 11 (e.g., base 18, heatsink 24, etc.). Radio assembly 10 and in particular reflector 14 includes one or more fastening apertures 36 for accepting one or more pins 38, thereby fastening heat sink 24, cap 26, base 18 and/or other elements of radio assembly 10 to reflector 14 and/or radome 16. Cap 26 provides a weatherproof seal to the cable bridge when in place and provide access to the power and data cables and connectors via the cable bridge apertures 43 when removed. Pin 38 as used herein refers to one or more types of screws, snap fit pin, or other element that is configured to mate with fastening apertures 36. Radio assembly 10 includes lift tab 40 that provides a place of attachment for radio assembly 10 for lifting radio assembly 10, e.g., for lifting radio assembly 10 to a position on a cellular tower. Further, contact points 22 are illustrated in dashed lines to indicate where base 18 and reflector 14 make contact. In this embodiment of radio assembly 10, there are eight contact points 22 (four contact per base 18). As shown, there is minimal contact between base 18 and reflector 14.

Figure 3:
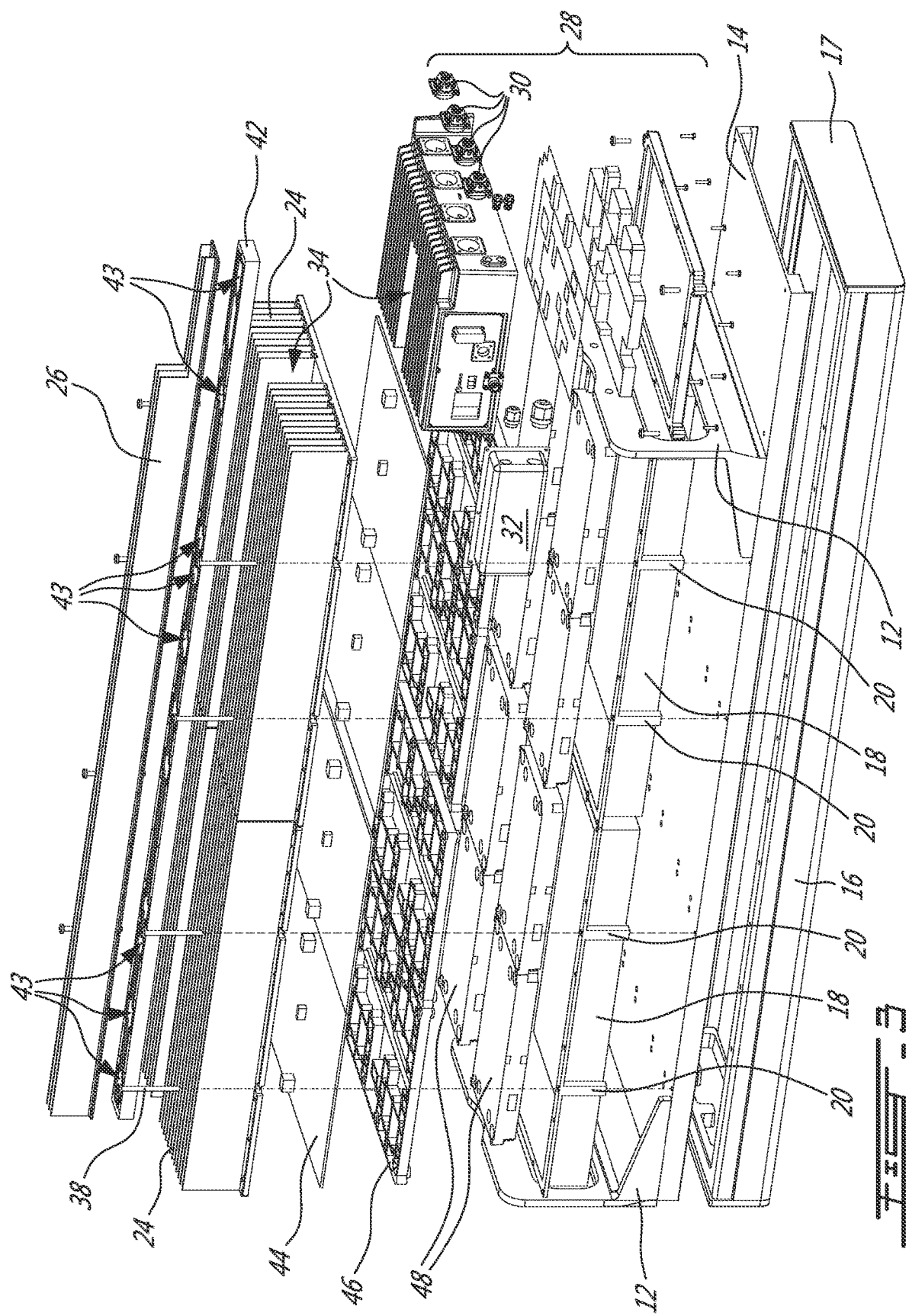
FIG. 3 is another exploded view of the radio assembly in accordance with the principles of the disclosure.

FIG. 3 is another exploded view of radio assembly 10 in accordance with the principles of the disclosure. In one embodiment, cable bridge 42 has an open cavity on one side below the cap 26 extending the length of the cable bridge and one or more cable apertures 43 facing the radio modules for guiding cables from FIB 28 to individual connectors along one or more radio boards or transceivers 44. In another embodiment, cable bridge 42 includes one or more cable apertures 43 on each side thereof for removably inserting cables therein. In one or more embodiments, cable bridge 42 is integrated into heatsink 24 such that heatsink 24 includes cable bridge 42 and associated cable apertures 43 and gaskets (discussed below), and other elements of cable bridge 42 discussed herein. In one embodiment cap 26 covers the cable bridge 42 and its cavity on one side or apertures if apertures are used on each side. In one embodiment, cap 26 includes heat sink fins. Radio boards 44 correspond to one or more transmit radios and/or one or more receive radios that are configured to transmit signals to one or more antennas disposed behind radome 16, and receive one or more signals from one or more antennas behind radome 16, e.g., 16T16R radios, 32T32R radios, etc. Radio assembly 10 includes one or more shields 46 that provide electrical isolation to areas of the PCB 44 for providing electromagnetic shielding. Radio assembly 10 includes one or more filters 48 for providing signal filtering functions known in the art.

Figure 4:
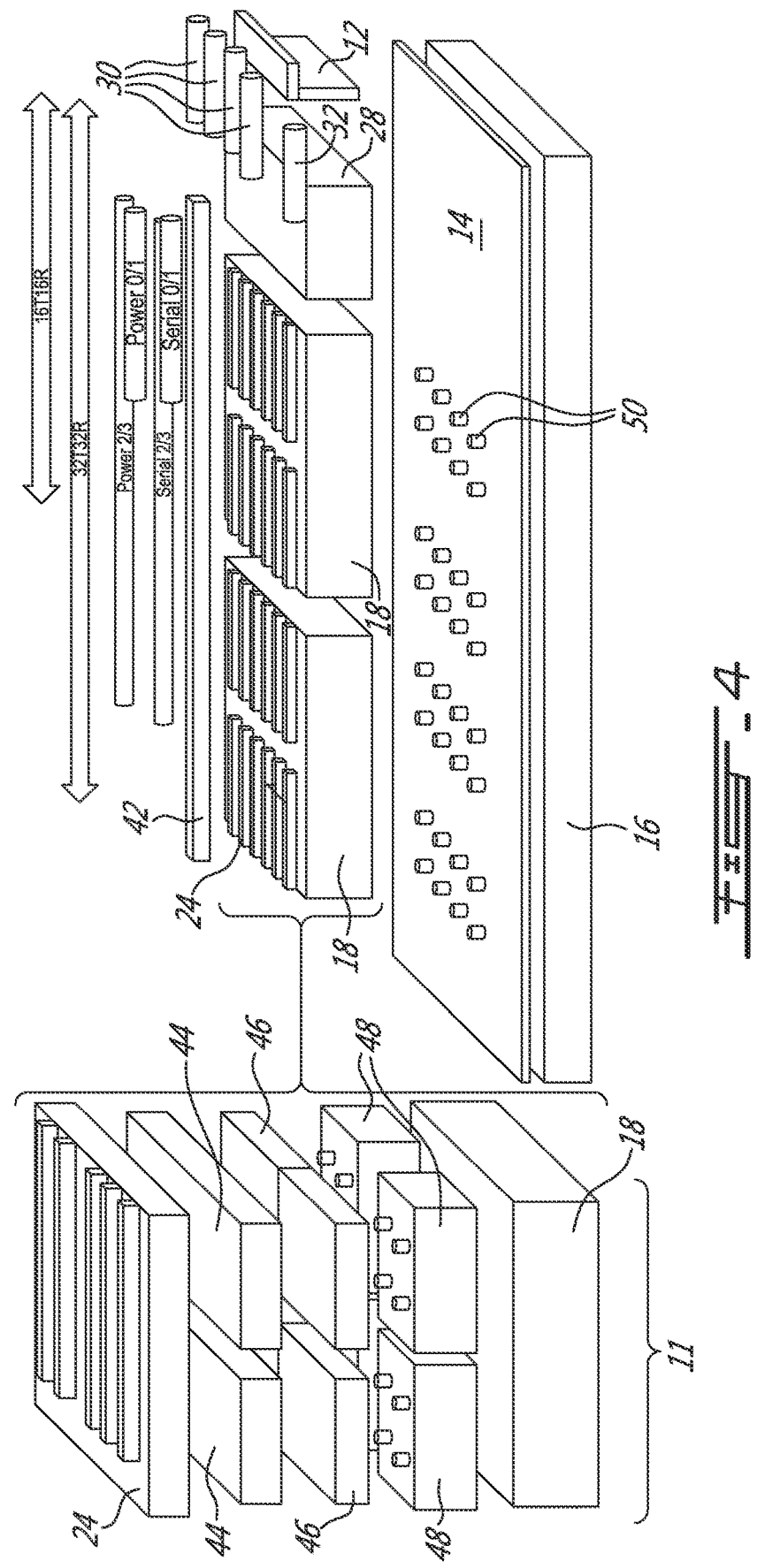
FIG. 4 is a block diagram of an exploded view of the radio assembly in accordance with the principles of the disclosure.

FIG. 4 is a block diagram of an exploded view of radio assembly 10 in accordance with the principles of the disclosure. In particular, the embodiment illustrated in FIG. 4 includes two radio modules 11 each with four radio boards or transceivers 44 for a total of thirty-two transmits and thirty-two receive radios. A length of channel bridge 42 covers or substantially equals both heat sinks 24 and part of FIB 28, thereby allowing both data cables (e.g., serial cables) and power cables originating at FIB 28 to be routed cable bridge 42, to one or more cable apertures 43 (not shown in FIG. 4). Cap 26 is omitted for clarity but cables, e.g., serial 2/3 and power 2/3, will be fully enclosed by channel bridge 42 and cap 26. In other words, cap 26 and cable bridge 42 contact each other to fully enclose one or more cables that are routed through cable channel 34. In one or more embodiments, reflector 14 includes one or more press-fit connectors 50 configured to be snap fit into base 18 and to enable connection of the antenna dipoles (FIGS. 13-15) to the radio boards 44. It should be noted that in the present embodiment, one radio module 11 includes two radio boards, each with an 8T8R configuration. Thus, each radio module 11 has a total of 16 transmit and 16 receiver radios.

Figure 5:
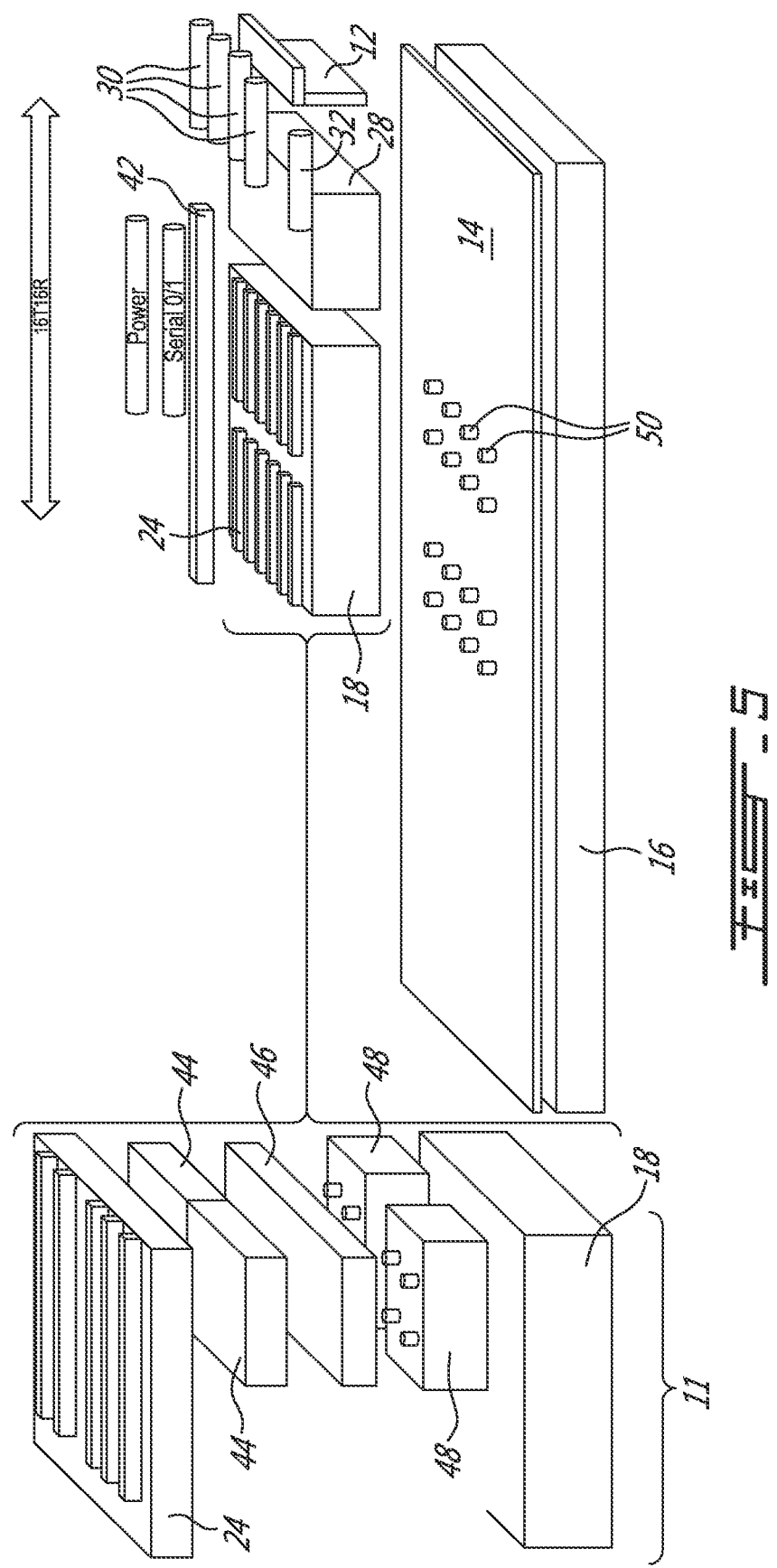
FIG. 5 is a block diagram of an exploded view of another embodiment of the radio assembly in accordance with the principles of the disclosure.

FIG. 5 is a block diagram of an exploded view of another embodiment of radio assembly 10 in accordance with the principles of the disclosure. In this embodiment, radio assembly 10 is configured to provide half of the capacity of the radio assembly of FIG. 4, that is, 16T16R radios with one radio module 11. As illustrated in FIG. 5, one base 18, heatsink 24 and corresponding hardware of one radio module 11 has been left out or removed from radio assembly 10 in a modular fashion, thereby providing for a 16T16R radio configuration. Radio assembly 10 advantageously allows modular blocks/components to be added or removed from radio assembly 10 with ease. The cap 26 and cable bridge 42 would only take up half the space since they only need to reach a single radio module.

Figure 6:
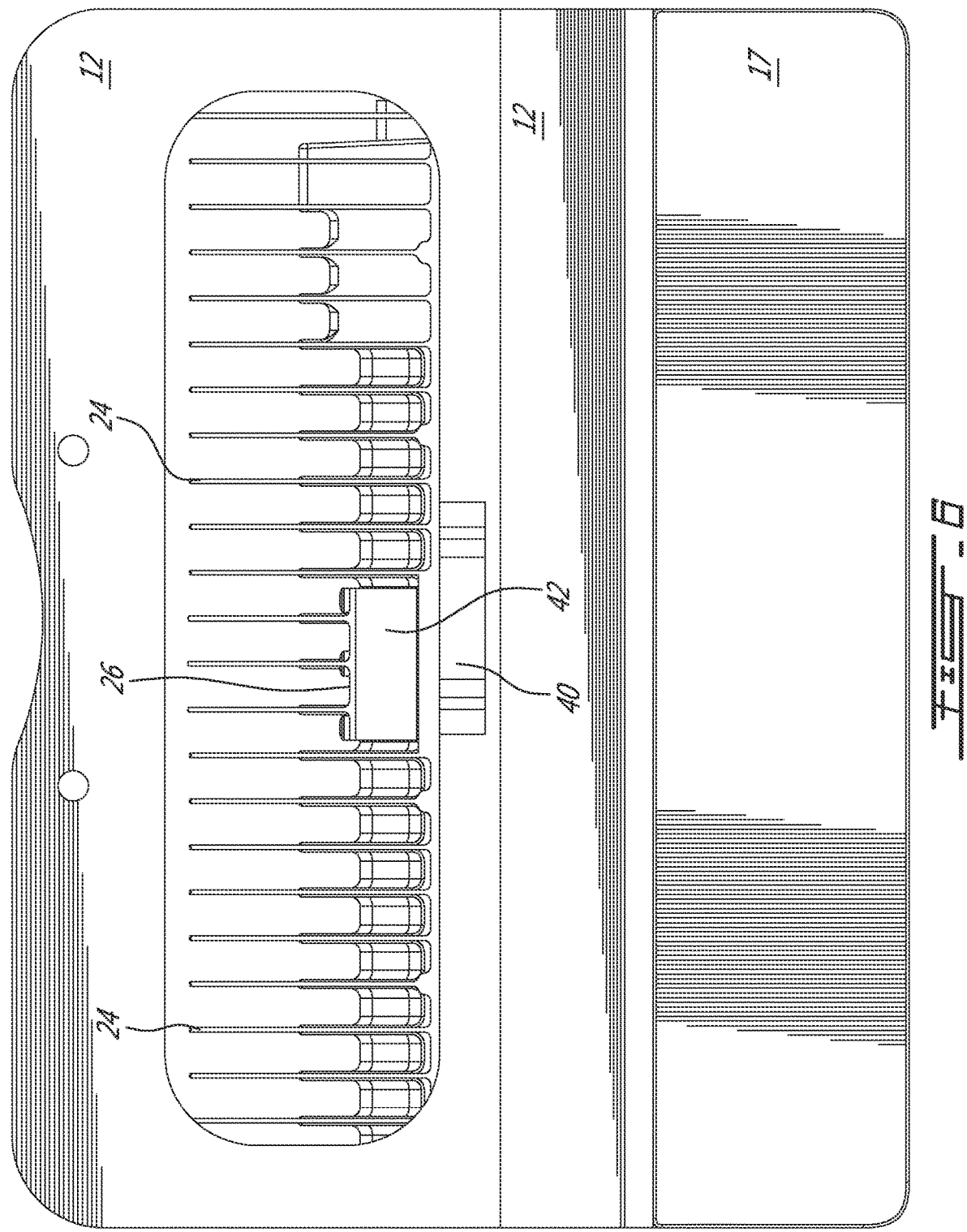
FIG. 6 is a top view of the radio assembly in accordance with the principles of the disclosure.
Figure 7:
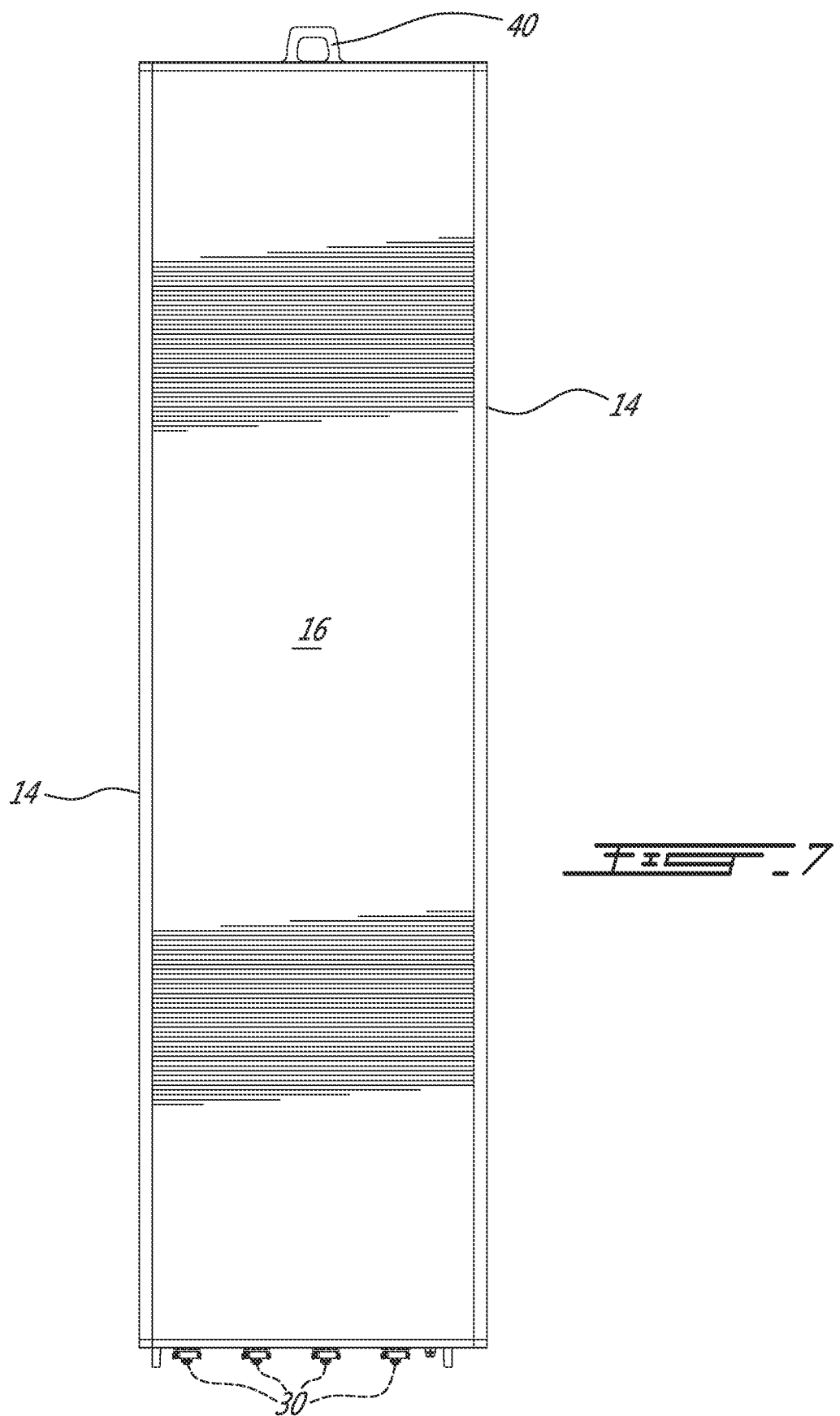
FIG. 7 is a front view of the radio assembly in accordance with the principles of the disclosure.
Figure 8:
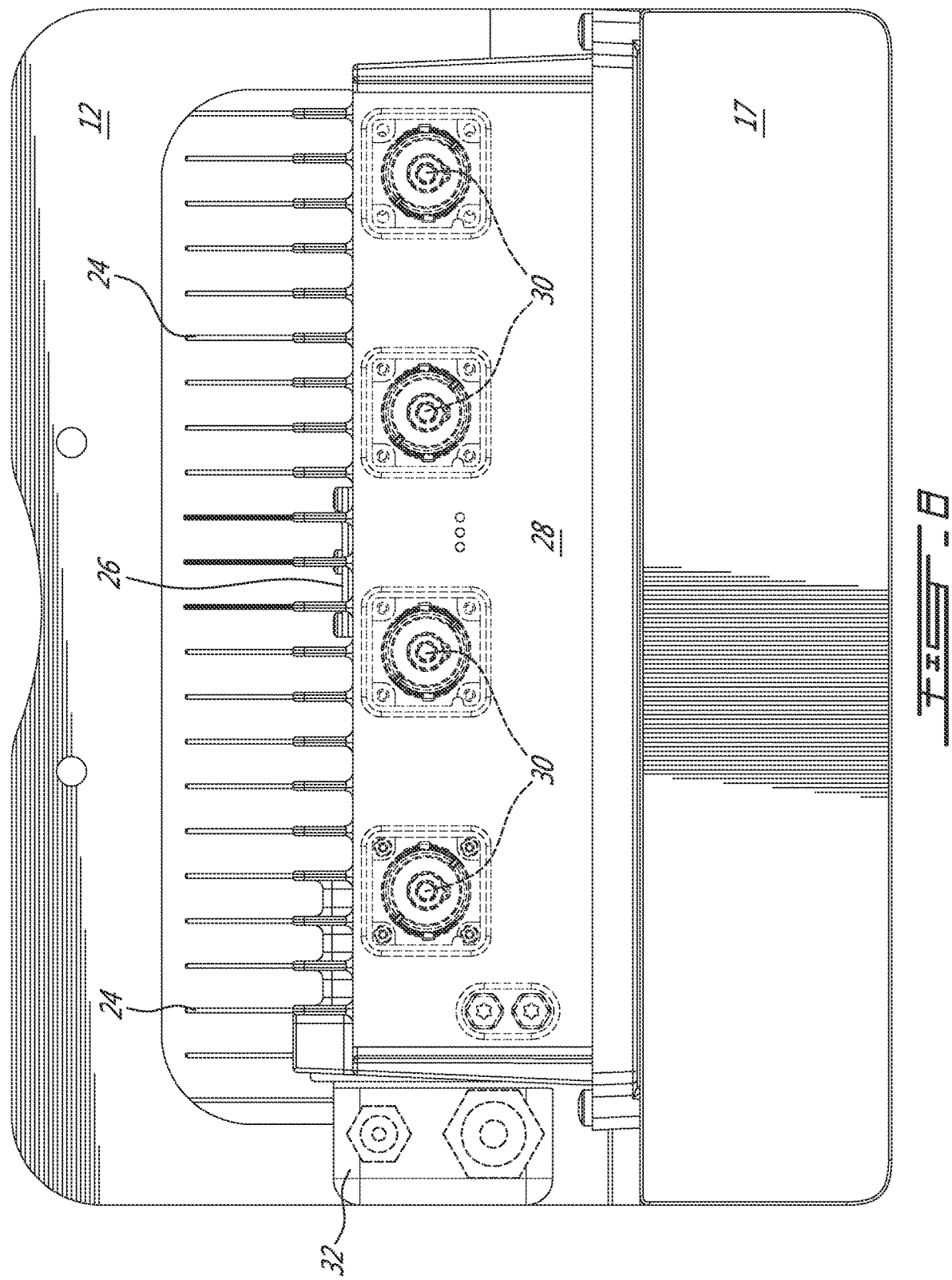
FIG. 8 is a bottom view of the radio assembly in accordance with the principles of the disclosure.

FIG. 6 is a top view of radio assembly 10 in accordance with the principles of the disclosure. While, cap 26 is illustrated having three fins, cap 26 is configurable to have more or less than three fins or no fins depending on the heat dissipation needs of the radio assembly. FIG. 7 is a front view of radio assembly 10 in accordance with the principles of the disclosure. Lift tab 40 extends from the mount 12 to assist in hoisting the radio up a pole or building. FIG. 8 is a bottom view of radio assembly 10 in accordance with the principles of the disclosure. While four optical-electric connectors 30, i.e., opto-electronic connectors 30, are shown, radio assembly is advantageously configurable with less than four optical-electric connectors 30, in one or more embodiments, such as if radio assembly is being configured with 16T16R radios.

Figure 9:
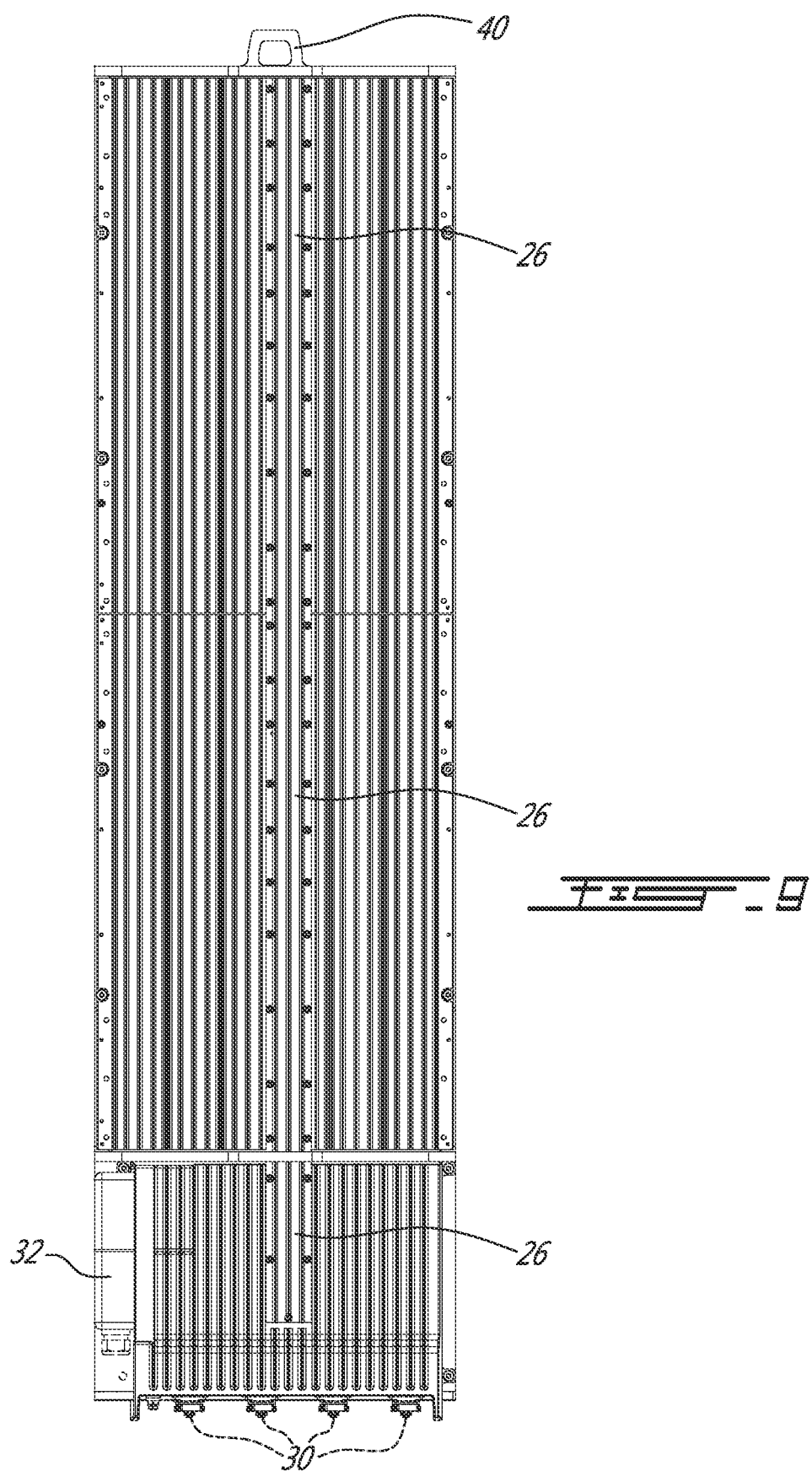
FIG. 9 is a rear view of the radio assembly in accordance with the principles of the disclosure.
Figure 10:
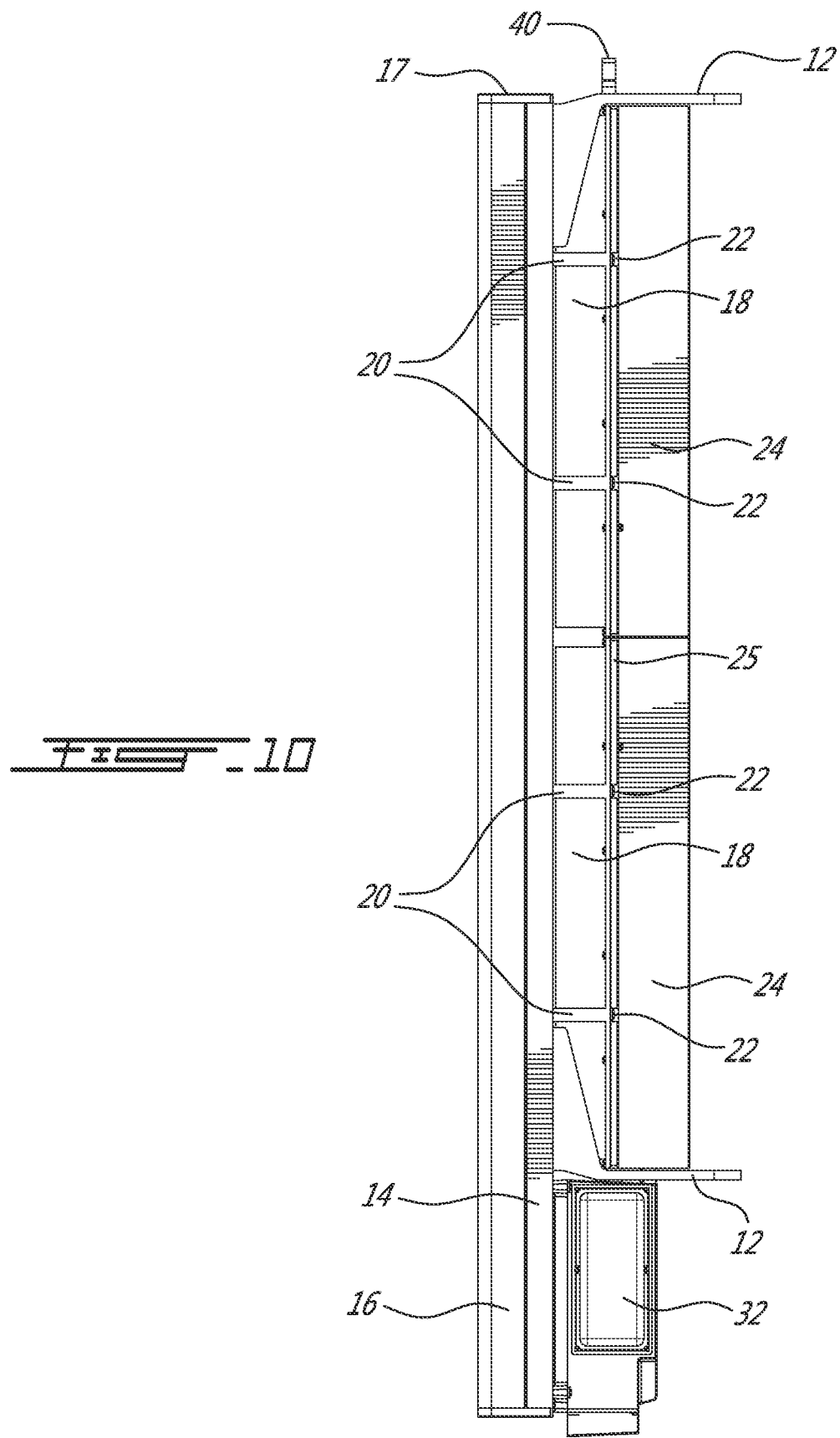
FIG. 10 is a right side view of the radio assembly in accordance with the principles of the disclosure.
Figure 11:
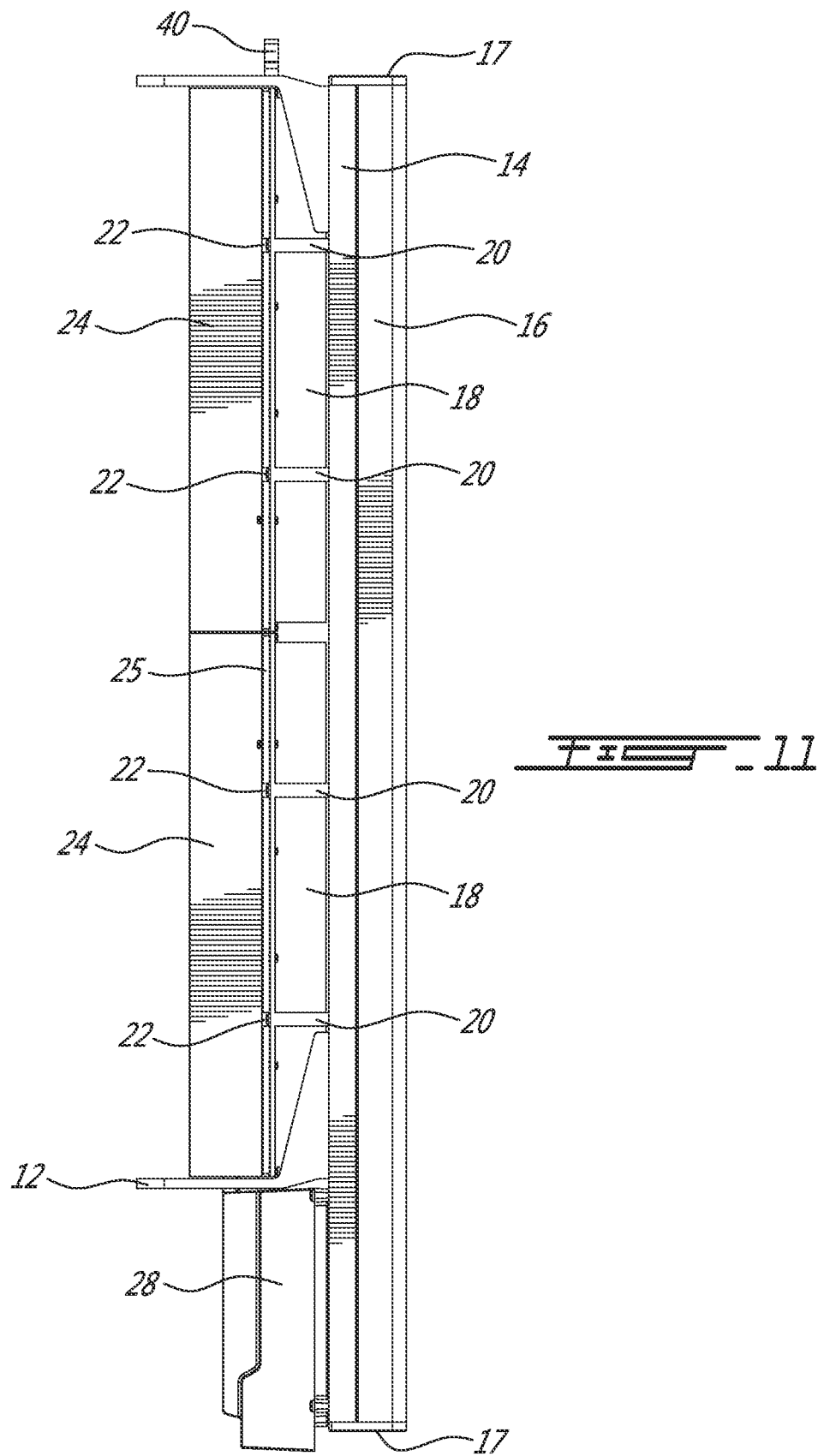
FIG. 11 is a left side view of the radio assembly in accordance with the principles of the disclosure.
Figure 12:
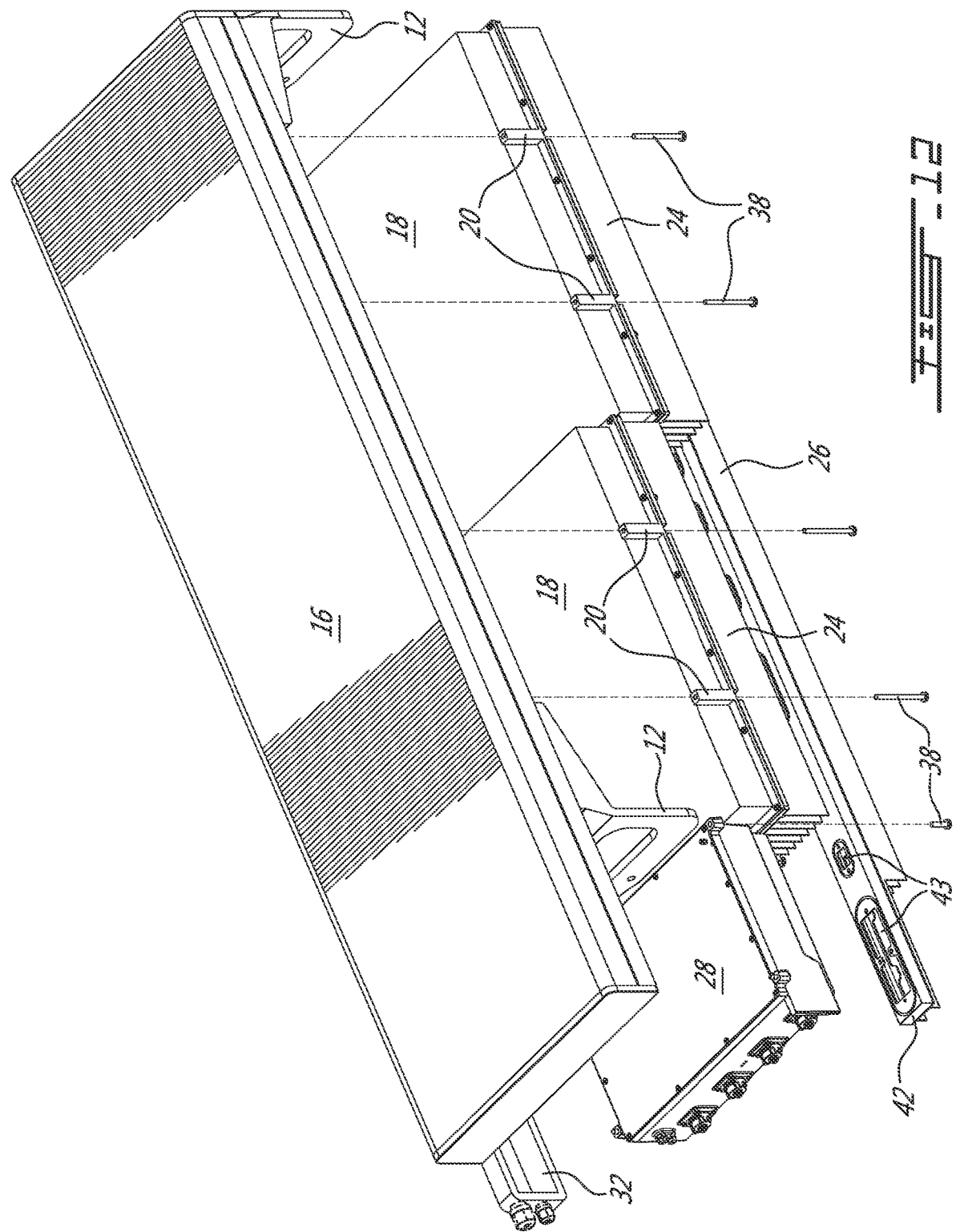
FIG. 12 is another exploded view of the radio assembly in accordance with the principles of the disclosure.

FIG. 9 is a rear view of radio assembly 10 in accordance with the principles of the disclosure. FIG. 10 is a right side view of radio assembly 10 in accordance with the principles of the disclosure. In particular, FIG. 10 illustrates a 32T32R radio configuration with two radio modules 11. Each radio module 11 has an 16T16R configuration. Thus, each radio module 11 has 16 transmit and 16 receiver radios. Further, standoffs 20 of base 18 are configured to minimize contact between base 18 and reflector 14, thereby helping reducing PIM. Contact minimization is illustrated by gap 25 which is created by each contact point 22. FIG. 11 is a left side view of radio assembly 10 in accordance with the principles of the disclosure. FIG. 12 is another exploded view of radio assembly 10 from the perspective of the radome 16. As illustrated in FIG. 12, cable bridge 42 includes several cable apertures 43 of one or more sizes, shapes, etc. such that data and power cables can be removably inserted into cable aperture 43. In one or more embodiment, cable apertures 43 are configured such as to accept wider cables which are twisted and then guided into cable aperture. This is made possible, in part, due to the availability to use non-hardened cables with radio assembly 10.

Figure 13:
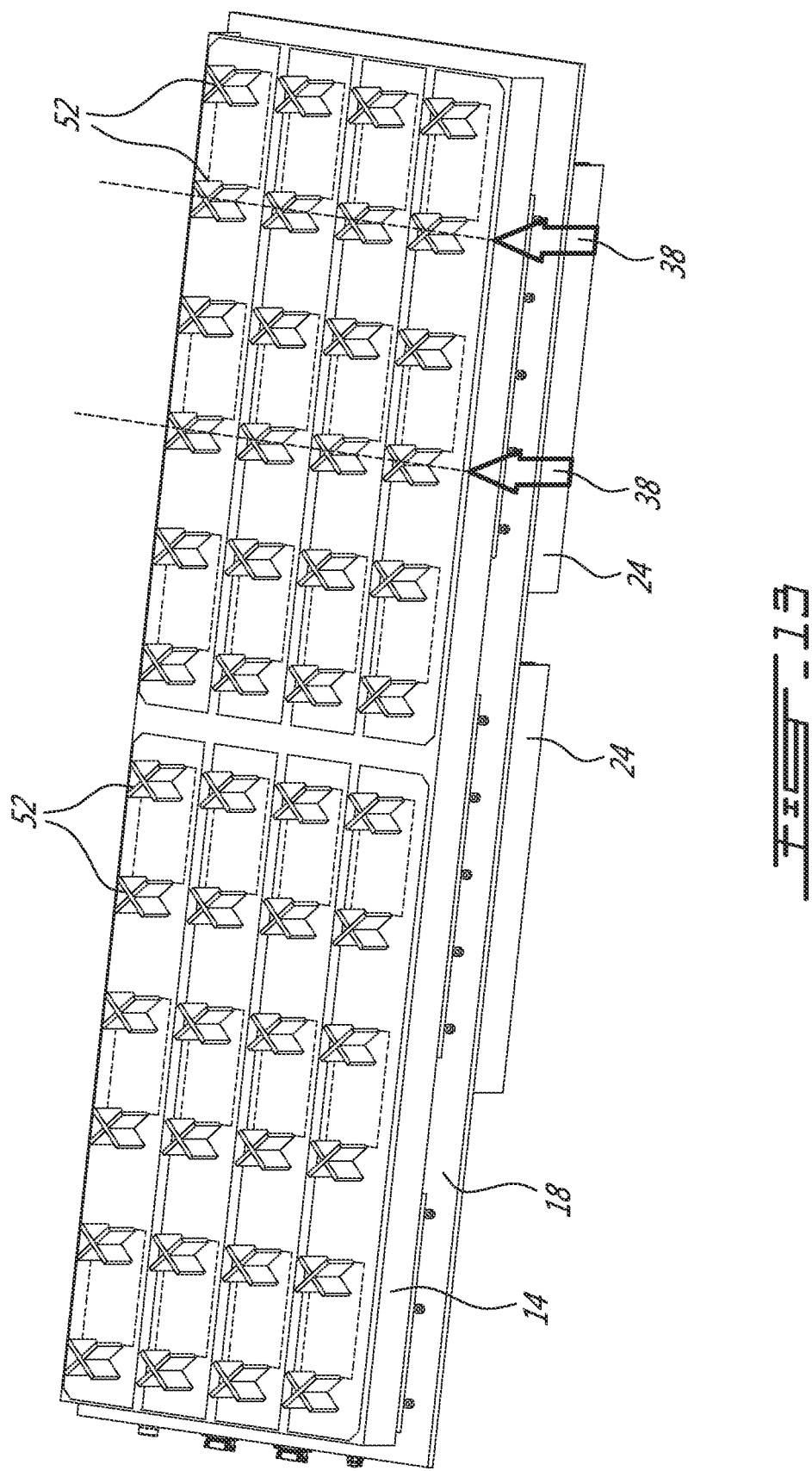
FIG. 13 is a perspective view of a portion of another embodiment of the radio assembly in accordance with the principles of the disclosure.
Figure 14:
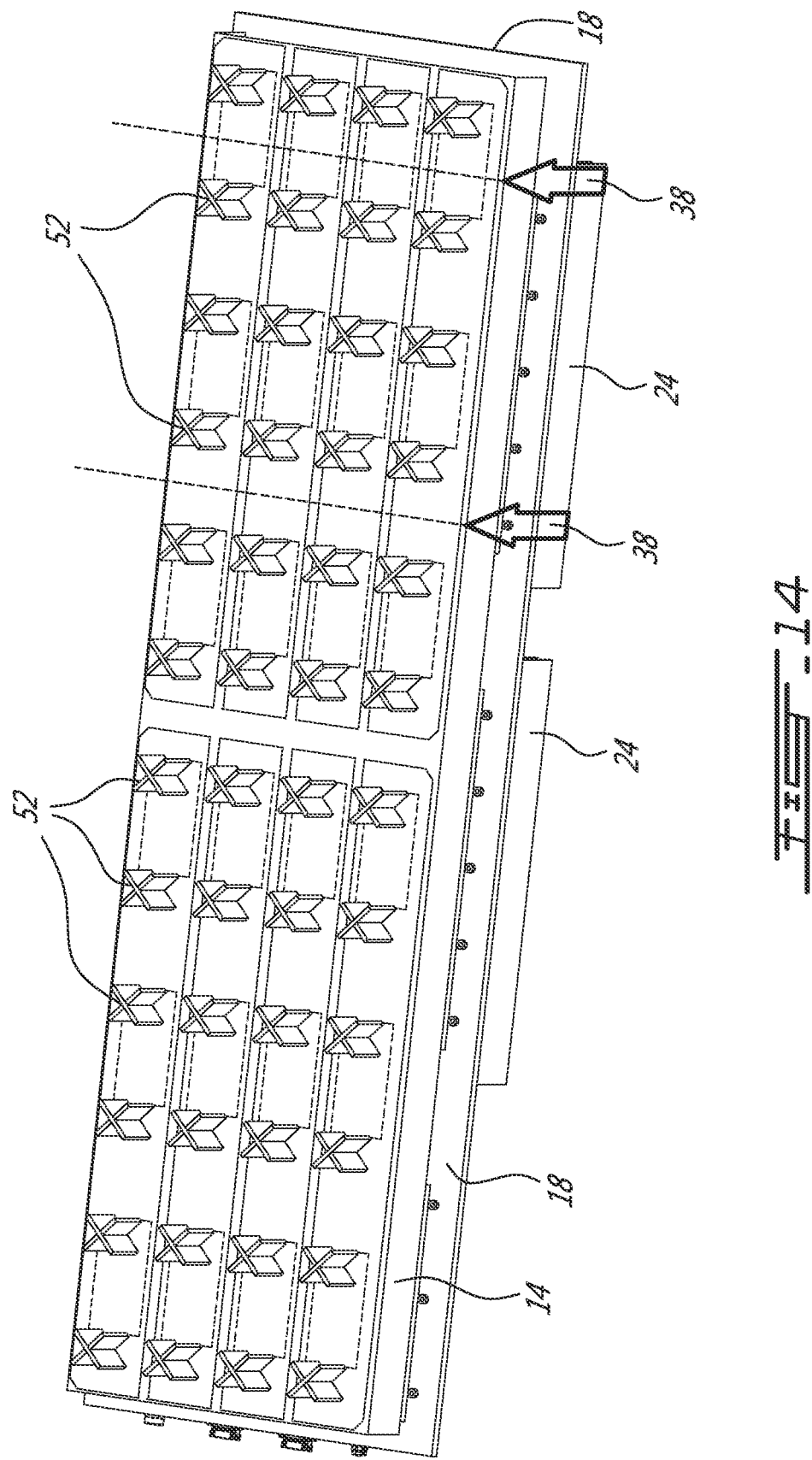
FIG. 14 is a perspective view of a portion of another embodiment of the radio assembly in accordance with the principles of the disclosure.

FIG. 13 is a perspective view of a portion of another embodiment of radio assembly 10 in accordance with the principles of the disclosure. The dipole antennas 52 are positioned between the antenna reflector 14 and radome 16 (see FIG. 3). The view presented in FIG. 13 illustrates the alignment of dipole antennas 52 and mounting pins 38. In particular, one or more pins 38 are aligned with a respective row of dipole antennas 52 such as to provide a first effect on PIM generation. The first effect on PIM generation being a reduction of PIM generation. This configuration aligns standoff 20 with dipole antenna(s) 52, and hence with the back lobe fields produced by row of dipole antennas 52. In one or more embodiments, dipole antennas 52 are cross-polarized dipole antennas. FIG. 14 is a perspective view of a portion of another embodiment of radio hosing 10 in accordance with the principles of the disclosure. In this embodiment, one or more pins 38 are configured to be misaligned with dipole antennas 52 and hence misaligned with respect to the back lobe fields provided by the row of dipole antennas 52, thereby providing a second effect on PIM generation different from the first effect. In one or more embodiments, the second effect on PIM generation is a different level in the reduction of PIM generation than the first effect. In one or more embodiments, dipole antennas 52, i.e., antenna array, have 96 elements: for 16T16R a 6-1 subarray and remote electrical tilt (RET), and for 32T32R with a 3-1 subarray and no RET.

Figure 15:
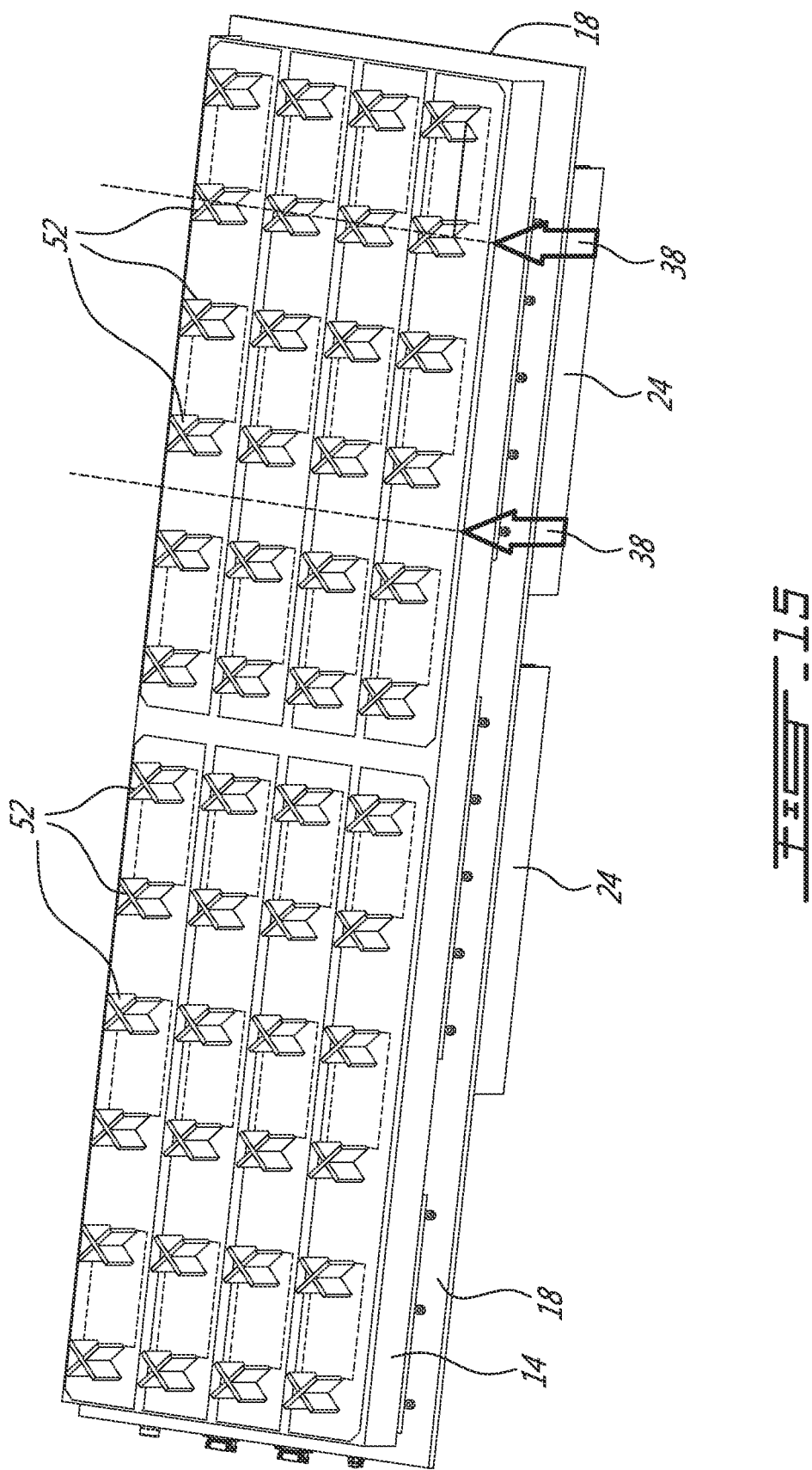
FIG. 15 is a perspective view of a portion of another embodiment of the radio assembly in accordance with the principles of the disclosure.

FIG. 15 is a perspective view of a portion of another embodiment of radio assembly 10 in accordance with the principles of the disclosure. In particular, pins 38 are dithered with respect to dipole antennas 52 and back lobe fields produced by the dipole antennas 52 such that one or more pins 38 are configured to be aligned with the dipole antennas and one or more other pins 38 are configured to be misaligned with dipole antennas, such as to provide a third effect on PIM generation. The third effect on PIM generation being different from the first and second effects on PIM generation. In one or more embodiment, the third effect on PIM generation is a different level in the reduction of PIM generation than the first and second effects.

Figure 16:
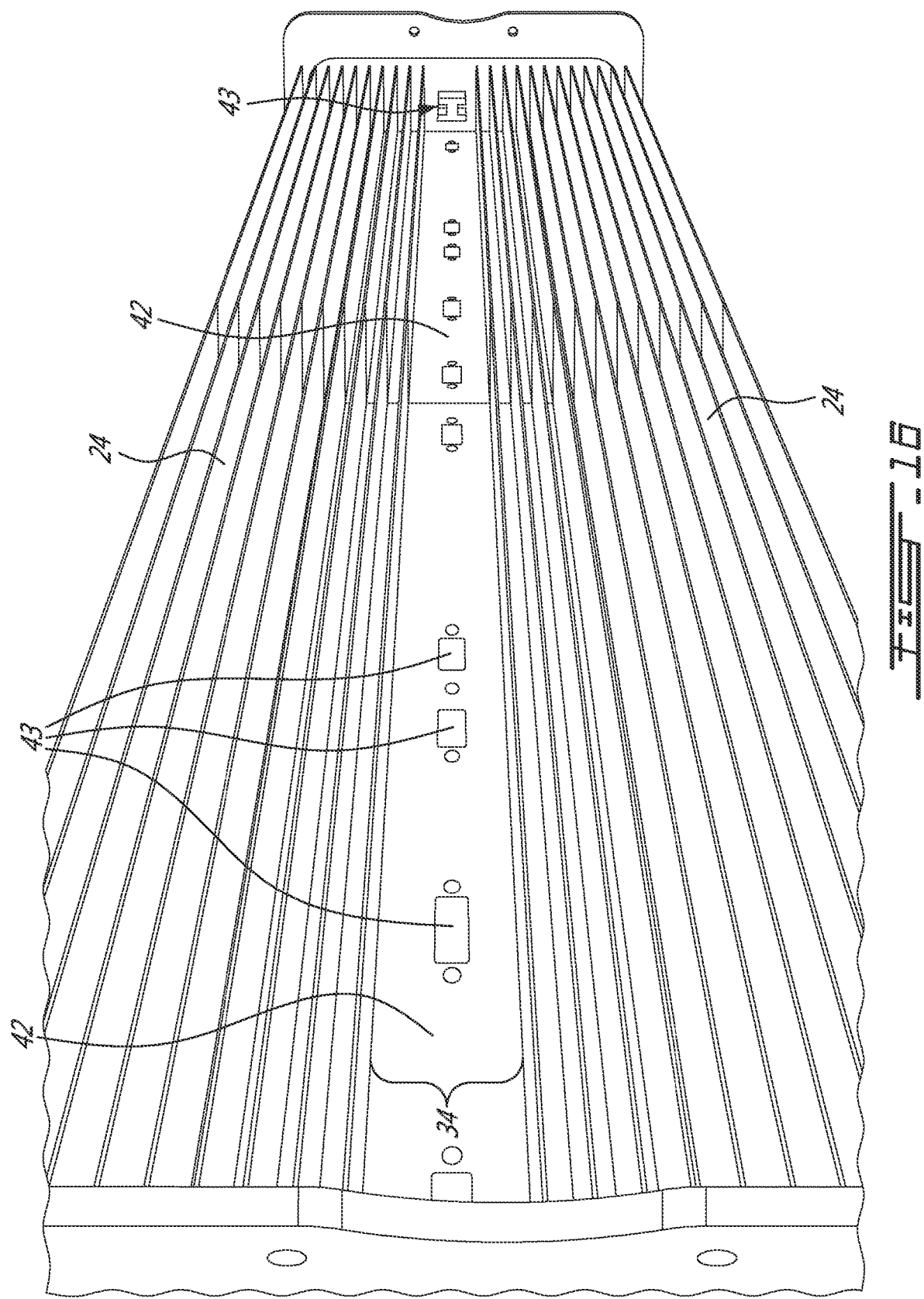
FIG. 16 is a rear view of a portion of one embodiment of the radio assembly in accordance with the principles of the disclosure.

FIG. 16 is a rear view of a portion of one embodiment of radio assembly 10 in accordance with the principles of the disclosure. In the embodiment of FIG. 16, the cable bridge 42 is removed to show the data and power cable apertures 43. The cables are routed from FIB 28 through the cable bridge (not shown) and multi-cable apertures 43 such that each cable can be positioned through cable aperture 43 for connection to radios 44. In one or more embodiments, cable apertures 43 are rectangular in shape such as to allow an installer to guide a cable connectors to a matting connector on radios 44. Since radio assembly 10 allows for non-hardened cables to be used, the data and power cables can be twisted and/or bent into cable apertures 43 for connection to radios 44, i.e., the cables are less rigid than weather hardened cables, thereby allowing for greater ease of installation.

Figure 17:
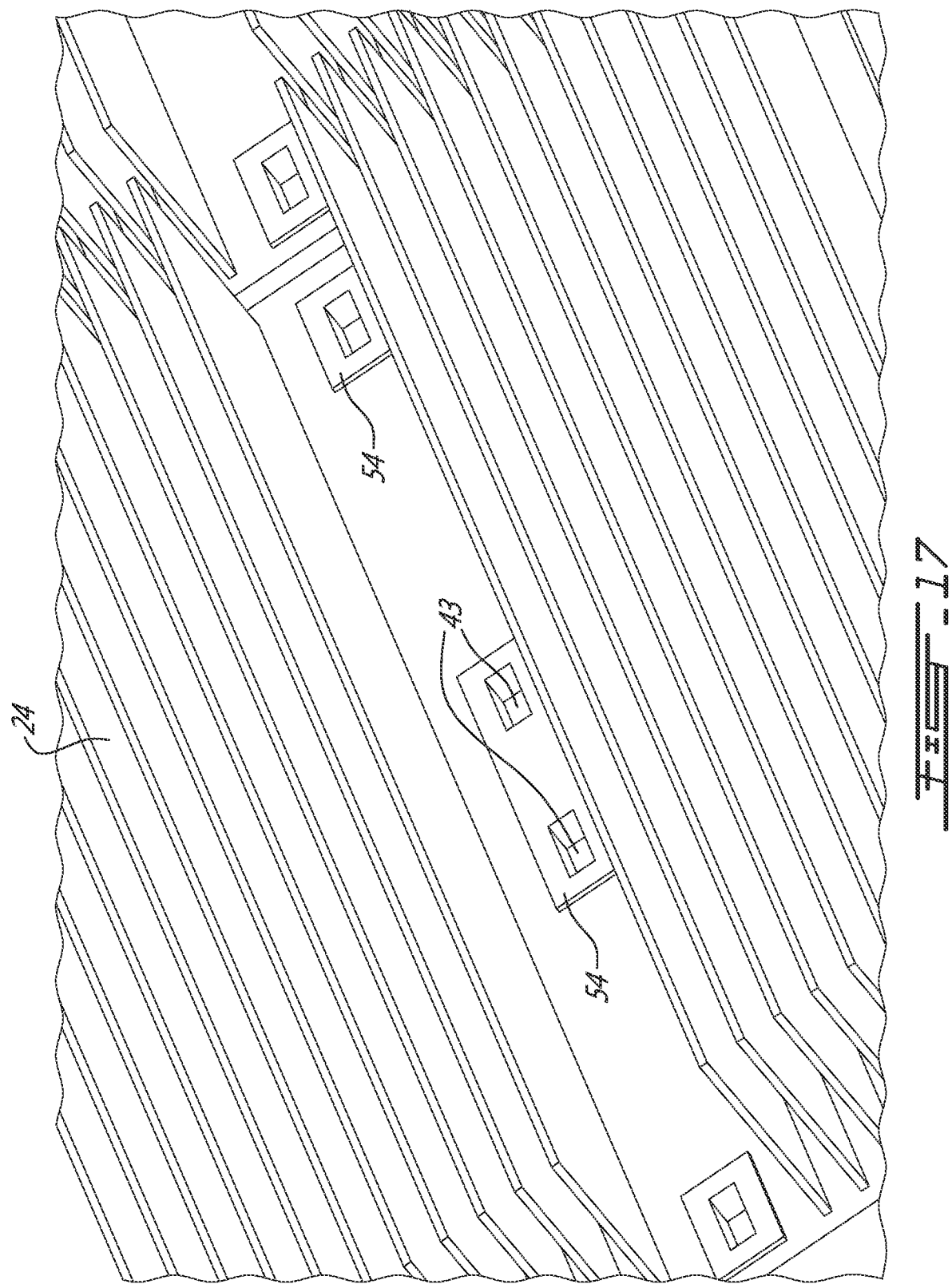
FIG. 17 is a rear view of a portion of the radio assembly in accordance with the principles of the disclosure.

FIG. 17 is a close-up view of a portion of radio assembly 10 in accordance with the principles of the disclosure. In one or more embodiments, one or more shaped gaskets 54 are fitted to one or more cable apertures 43 on the surface of the cable bridge 42. The cap and cable bridge are normally superimposed on the cable channel and would cover the cable aperture openings. In one or more embodiments, gasket 54 has a rectangular shape. In one or more embodiments, gasket 54 includes a pointed or sloped side facing the top of radio assembly 10 such that water running down radio assembly 10 when mounted vertically to a pole or other surface will not remain at the top side of the gasket, i.e., the shaped gasket sheds water instead of letting the water stand. In one or more embodiments, gasket 54 is configured to seal a perimeter of a respective cable aperture 43 between the surfaces of the cable channel and cable bridge. In the case where radio will be mounted horizontally, i.e., with the long sizes of radio assembly 10 horizontal with respect to the ground, the pointed or sloped side can be arranged so that water will be distributed away from cable aperture 43.

FIG. 18 is a top view of cable 56 with male connector 58, and female connector 60 in accordance with the principles of the disclosure. Cable 56 includes a plurality of individually shielded wires. For example, in one or more embodiments, cable 56 includes one or more individual pairs of shielded wires to provide protection against cross-talk. However, the full cable 56 is unshielded since heat sink cap 26 and channel bridge 42 fully enclose the cable along its length providing Electromagnetic Compatibility (EMC) and mitigation of PIM. Female connector 60 is affixed to radio 44 and, in some embodiments, aligned with cable aperture 43, thereby allowing an installer to guide cable 56 with male connector 58 through cable aperture 43 and into female connector 60. In one or more embodiments, cable 56 is used for data communication such as high speed electrical data communication, while different cables are used for power. The power cables can still be routed through cable apertures 43.

Figure 19:
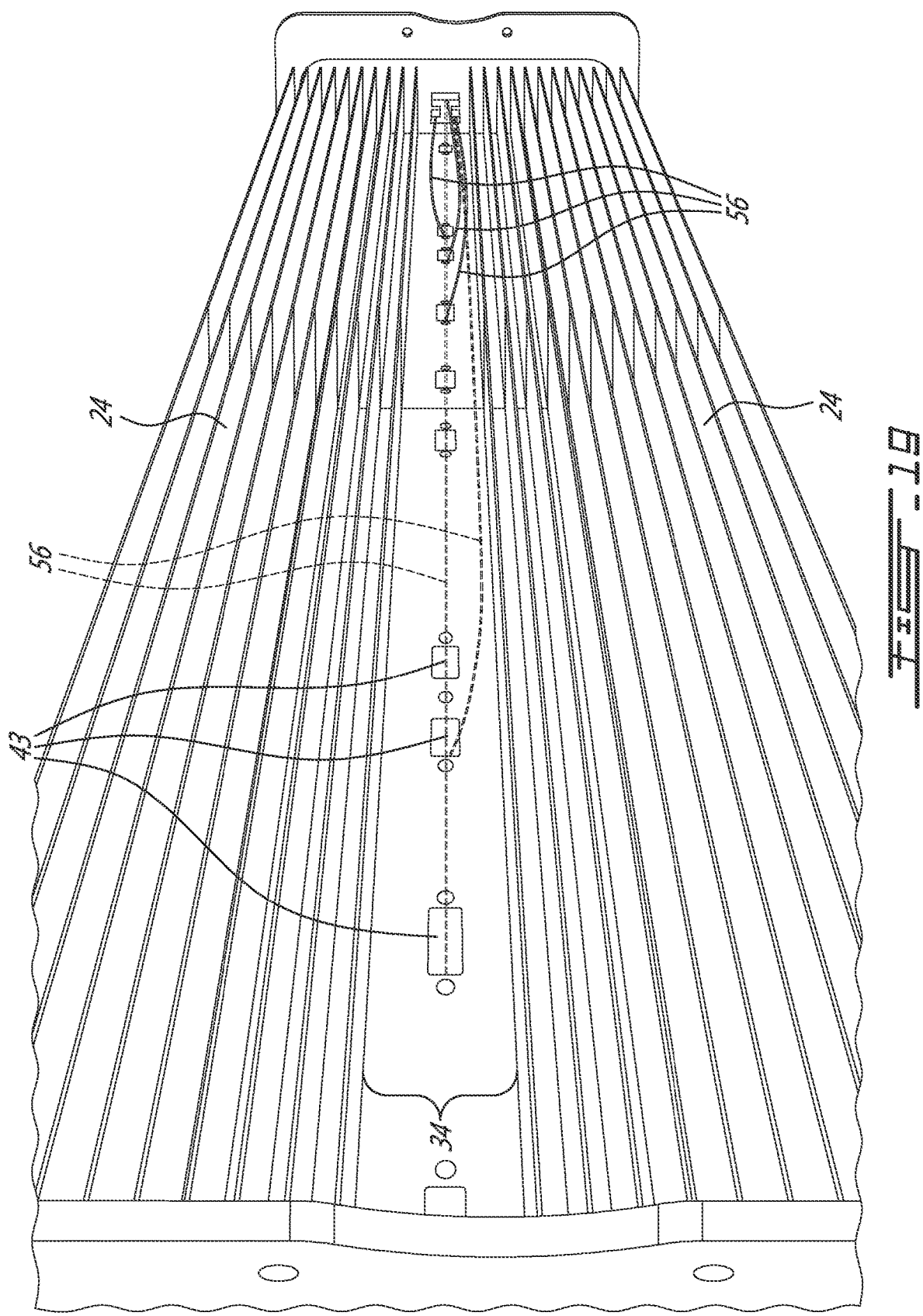
FIG. 19 is a rear view of a portion of one embodiment of the radio assembly with cables routed through the cable bridge in accordance with the principles of the disclosure.

FIG. 19 is a rear view of a portion of one embodiment of radio assembly 10 with cables 56 routed through cable channel 34 but with the cable bridge 42 removed for clarity in accordance with the principles of the disclosure. Several cables 56 such as data and/or power cables are routed from multi-cable aperture 43, through cable channel 42 (see FIG. 12), and to respective cable apertures 43 of each radio module for connection to one or more elements in base 18 such as to radios 44. In one or more embodiments, if cables 56 such as the one illustrated in FIG. 18 are used for communicating high speed data, cables 56 will be stacked on top of each other (not shown in FIG. 19 for clarity).

Figure 20:
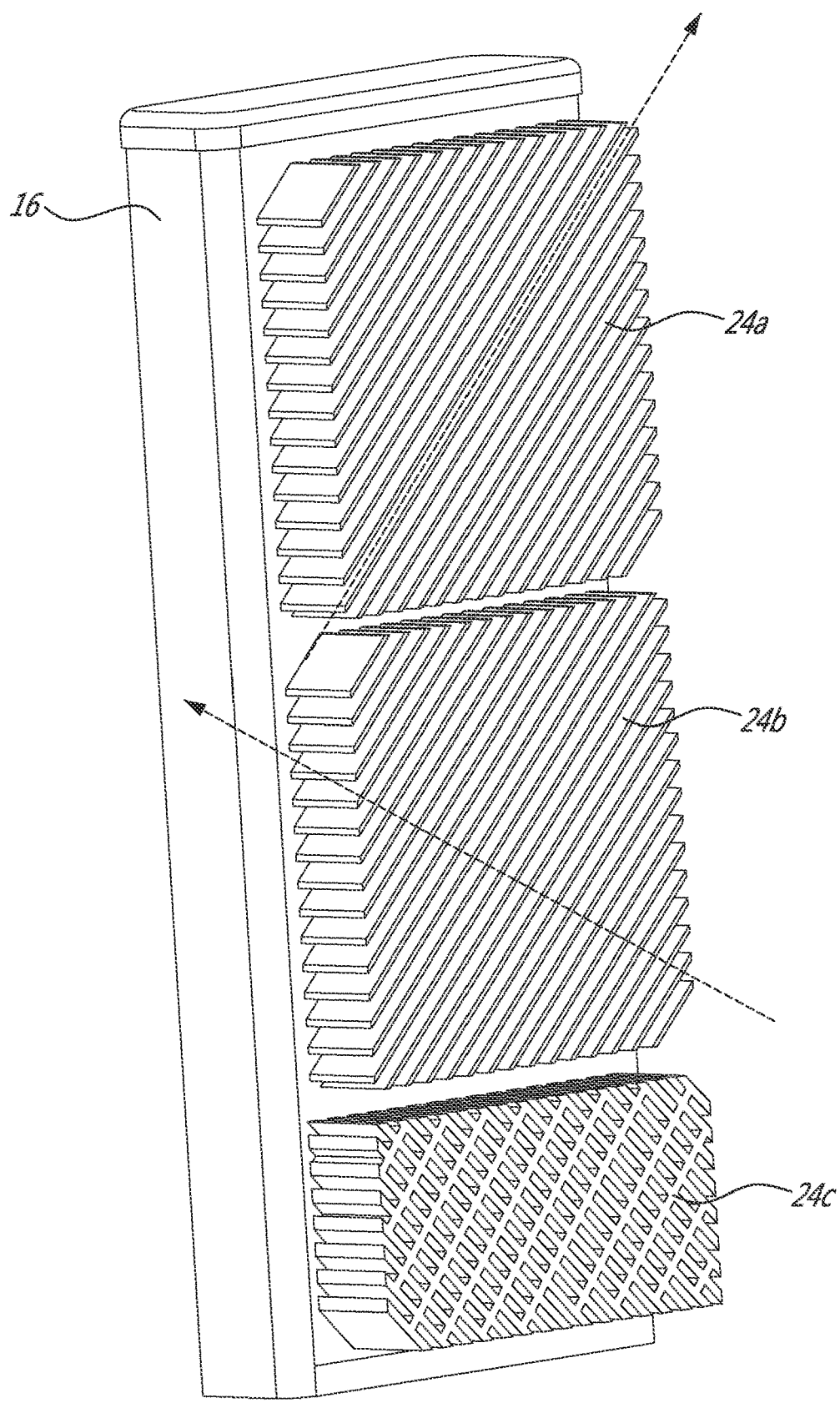
FIG. 20 is a perspective view of a portion of one embodiment of the radio assembly in accordance with the principles of the disclosure.

FIG. 20 is a perspective view of a portion of one embodiment of radio assembly 10 in accordance with the principles of the disclosure. Heat sink 24*a* includes fins oriented at forty-five degrees with respect to a side of radome 16. For example, the plurality of fins are oriented forty-five degrees with respect to the plurality of standoffs 20. In one or more embodiments, heat sinks 24*a*-24*b* are configured to have the fins oriented in the same manner as illustrated in FIG. 18. In one or more embodiments, one or more heat sinks 24 are oriented such that the fins are perpendicular to other fins of other heat sink(s) 24. For example, fins of heat sink 24*b* could instead be orientated to be parallel to the arrow drawn over heat sink 24*b* such as to be perpendicular in orientation to fins on heat sink 24*a*. One advantage of the embodiments of FIG. 19 is that heat dissipation from radios 44 to heat sink 24 will still function when radio assembly 10 is mounted vertically or horizontally. In another embodiment, the heat sink fins have a square shaped pattern 24*c*.

Figure 21:
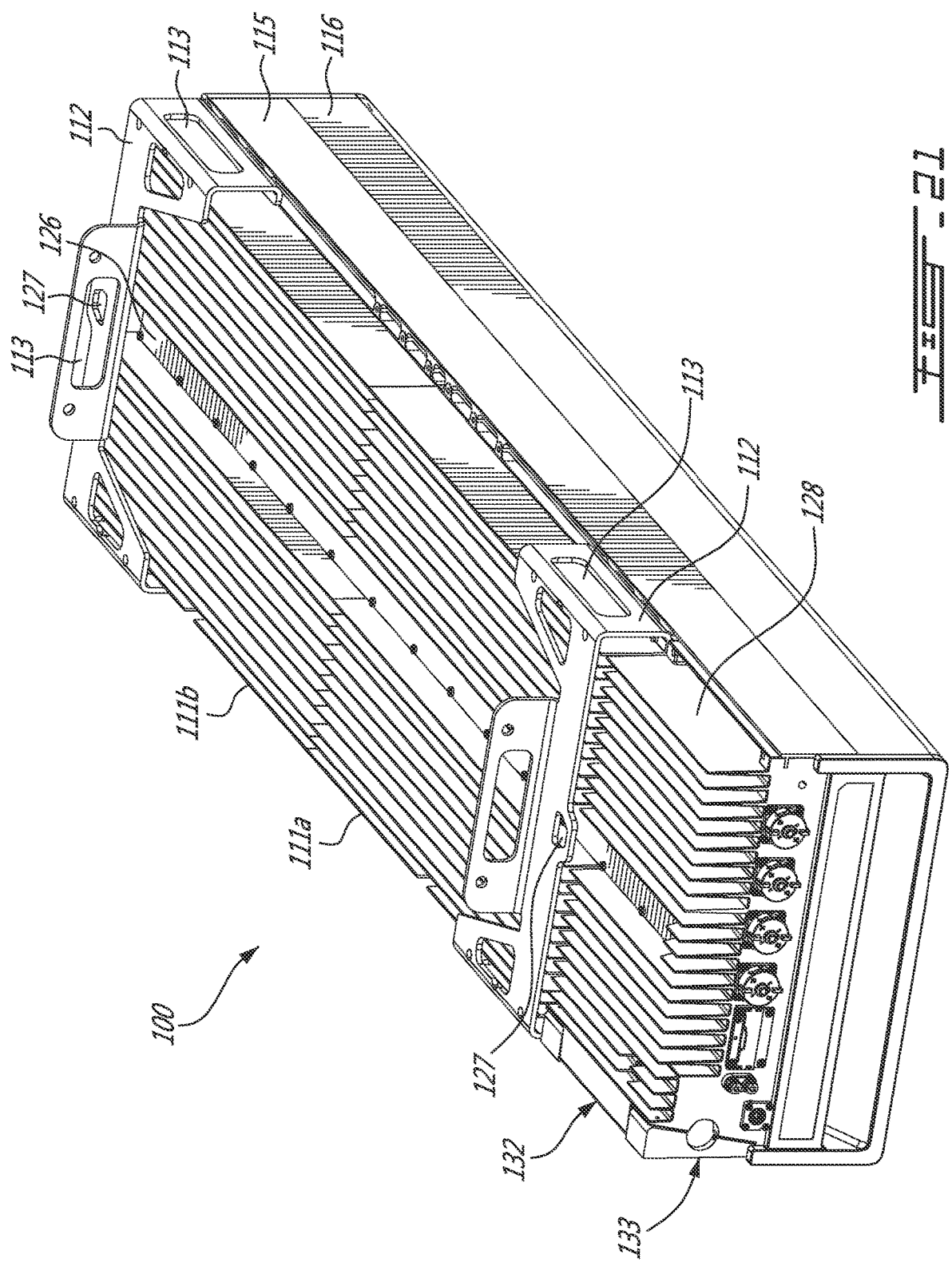
FIG. 21 is a diagram of an exemplary radio assembly with modularized radios and interconnects in accordance with another embodiment of the disclosure.

FIG. 21 is a perspective view of a radio assembly 100 according to another embodiment of the present disclosure. In this embodiment, mounts 112 are provided with built-in lift handles 113 to enable a technician or installer to manipulate the radio assembly 100 during unpacking, lifting and mounting of the radio assembly on a suitable surface. The radio assembly is further environmentally protected with the use of side panels 115 mounted adjacent the radio modules 111*a-b* and FIB 128. Similarly, the radome 116 is provided with side edges which extend further to meet with the side panels 115 to provide additional environmental protection. In this embodiment, the cap 126 is provided with no heat sink fins to reduce manufacturing costs while still providing a good surface area for heat dissipation and improving air flow at the center of each radio module. The mounts 112 are further provided with lifting tabs 127 to enable the use of lifting cables and grappling hooks to raise or hoist in place the radio assembly when installed and mounted at elevated locations, such as poles, buildings, etc. The installer is thus given free use of his hands to install the radio assembly. Weatherproofing of the radio is further improved with the addition of a pivoting cover 133 for power unit 132.

Figure 22:
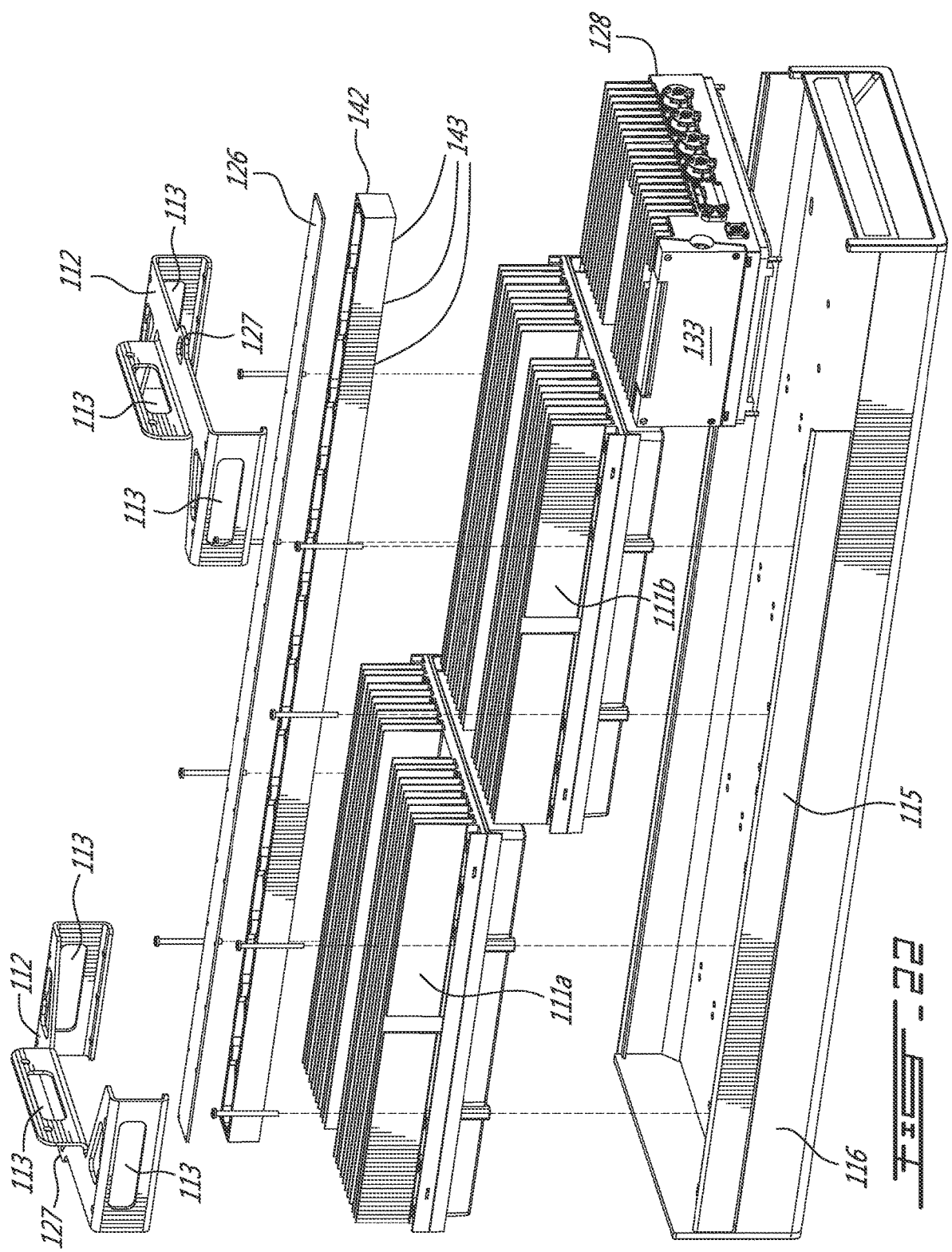
FIG. 22. is an exploded view of the radio assembly in accordance with the embodiment of FIG. 21.

FIG. 22 is a simplified exploded view of the radio assembly of FIG. 21. The mounts 112 with the built-in lift handles 113 and lifting tabs 127 partially wrap around the radio modules to provide enhanced rigidity.

The cable bridge 142 has a single open cavity on one side and apertures 143 on the other side thereof. The cable bridge 142 makes use of a cap 126 to seal the open cavity of the cable bridge. In this embodiment, cap 126 has no heat sink fins as indicated above. As indicated earlier, the cable bridge 142 adds structural rigidity, electromagnetic isolation, weatherproofing and access to the data and power cables extending from the PIB 128 to each radio module 111*a-b*.

Figure 23:
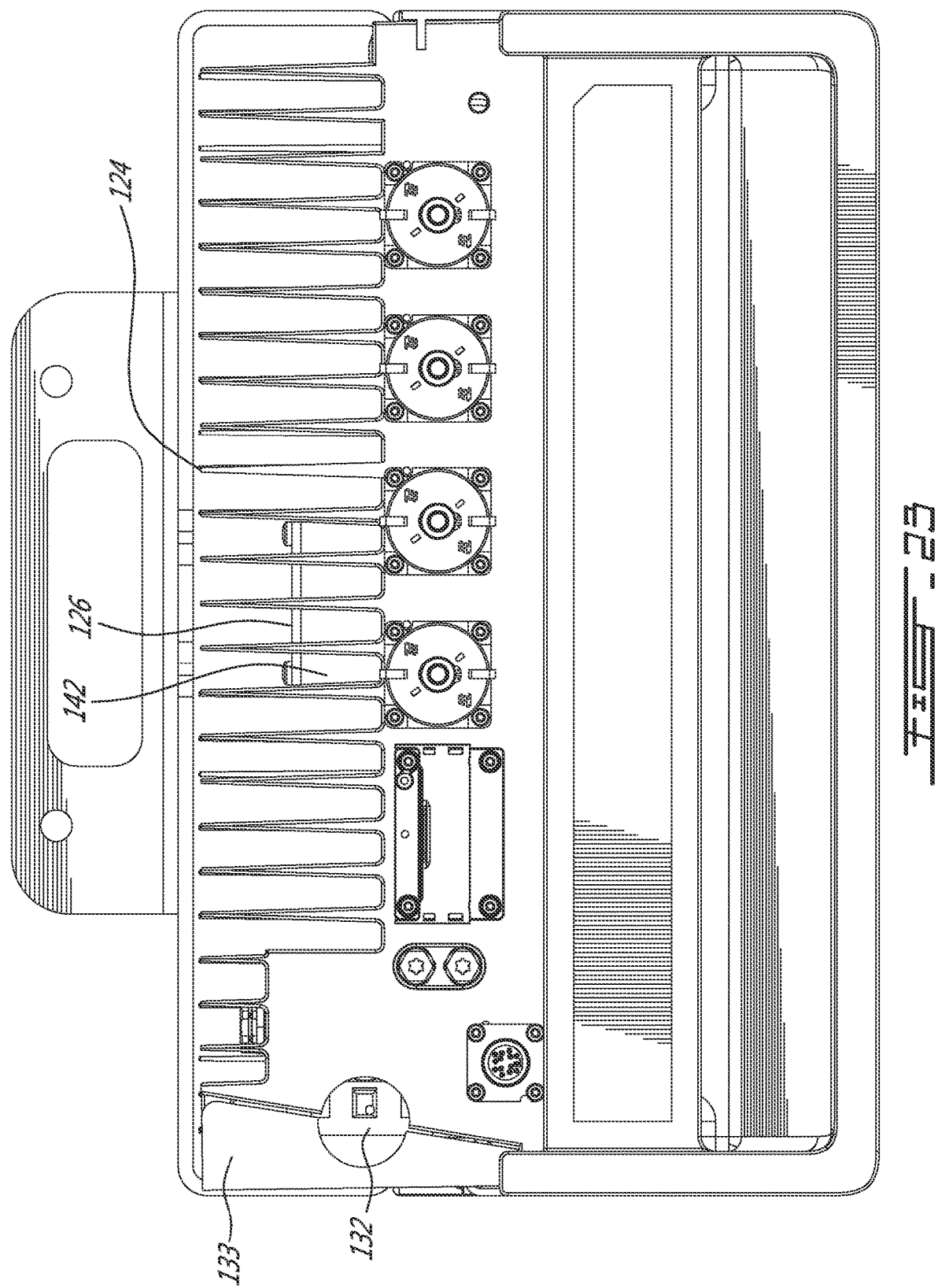
FIG. 23 is a bottom view of the radio assembly in accordance with the embodiment of FIG. 21.

FIG. 23 is a bottom end view of the radio assembly 100. The heat sink fins 124 which are shown are those of the FIB 128 since the cap 126 of cable bridge 142 has no heat sink fins in this embodiment. FIG. 23 shows a side view of the cover 133 of power unit 132. An installer can access the power unit 132 by pivoting the cover 133.

In one or more embodiments, assembly of radio assembly 10 occurs as follows:
1. Assemble FIB 28:
   a. Heatsink 24 face down
   b. Install FIB 28 card
   c. Install FIB 28 cover
   d. Screw together with pin(s) 38
   e. Test FIB 28
2. Assemble radio subsystems:
   a. Heat Sink 24 face down
   b. Install two radio 44 boards
   c. Install two radio shields 46
   d. Screw radio 44 and shield 46 to base 18
   e. Install connector bullets 50 to filter 48
   f. Screw in filters 48 with pin(s) 38
   g. Install base 18 and screw to heat sink 24
   h. Test Radio
3. Assemble full system:
   a. Place dipole antenna 52 with dipoles facing down
   b. Install connector bullets to filter 48
   c. Install two radio subsystems & screw down
   d. Install one FIB 28 & screw down
   e. Install bottom of cable bridge 42 with gaskets 54
   f. Install power and high-speed serial cables 56
   g. Install cap 26 with gaskets 56
   h. Screw cable bridge 42 and cap 26 together and to cable channel 34
   i. Test assembled radio assembly 10

Therefore, radio assembly 10 allows for a modular building practice with FIB 28 and an expandable number of radio modules (i.e., radomes 18 with filter 48, radios 44, etc.), connected via cables routed along cable bridge 42 in a EMI- and PIM-managed and environmentally sealed manner. Also, radio assembly 10 allows for consistent ease of manufacturing and test, and employing of low cost non-hardened cables.

As will be appreciated by one of skill in the art, the concepts described herein may be embodied as a radio assembly or apparatus. Many different embodiments are disclosed herein, in connection with the above description and the drawings. It will be understood that it would be unduly repetitious and obfuscating to literally describe and illustrate every combination and sub-combination of these embodiments. Accordingly, all embodiments can be combined in any way and/or combination, and the present specification, including the drawings, shall be construed to constitute a complete written description of all combinations and sub-combinations of the embodiments described herein, and of the manner and process of making and using them, and shall support claims to any such combination or sub-combination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A radio assembly, comprising:
   at least one radio module and a radome;
   the radio module having a heatsink disposed on one side, a radio module base on the other side thereof, the radio module base being disposed between the heatsink and the radome, the heatsink defining a cable channel for routing at least one power cable and at least one data cable;
   a faceplate interface board (FIB), the FIB including a plurality of opto-electronic connectors and a power unit;
   the at least one power cable being in communication with the power unit, the at least one power cable being routed to the radios via at least one cable aperture; and
   the at least one data cable being in communication with at least one opto-electronic connector of the plurality of opto-electronic connectors, the at least one data cable being routed to the radios via the at least one cable aperture.

2. The radio assembly of claim 1, further comprising a reflector disposed between the radome and the radio module base;
   the base including a plurality of standoffs, the plurality of standoffs configured to offset a substantial portion of the at least one radio module from the reflector.

3. The radio assembly of claim 2, further comprising a cable bridge configured to be removably inserted into the cable channel, the cable bridge including:
   a plurality of cable apertures;
   a plurality of gaskets, each of the plurality of gaskets configured to seal a perimeter of a respective cable aperture of the plurality of cable apertures.

4. The radio assembly of claim 3, wherein the cable apertures are sealed when the cable bridge is inserted into the cable channel.

5. The radio assembly of claim 1, further comprising:
   a reflector, the at least one radio module base being disposed on the reflector;
   the radome including a plurality of antennas, the reflector being disposed on the radome;
   at least one pin, the at least one pin configured to fasten the at least one radio module base to the reflector.

6. The radio assembly of claim 5, wherein the at least one pin is configured to be aligned with a back lobe of a row of the plurality of antennas.

7. The radio assembly of claim 5, wherein the at least one pin is configured to be misaligned with a back lobe of a row of the plurality of antennas.

8. The radio assembly of claim 5, wherein the at least one pin includes a plurality of pins, at least one pin of the plurality of pins is configured to be aligned with a back lobe of a row of the plurality of antennas, at least one other pin of the plurality of pins is configured to be misaligned with a back lobe of a row of the plurality of antennas.

9. The radio assembly of claim 5, wherein the plurality of antennas are dipole antennas.

10. The radio assembly of claim 1, wherein the FIB is provided with removable tabs for receiving additional opto-electronic connectors.

11. The radio assembly of claim 1, wherein the at least one power cable and the at least one data cable are non-hardened cables.

12. The radio assembly of claim 1, wherein the at least one radio module has 16 transmit and 16 receive radios.

13. The radio assembly of claim 1, wherein the radio assembly is expandable to 32 transmit and 32 receive radios using the FIB.

* * * * *